US009263974B1

(12) United States Patent
Henderson et al.

(10) Patent No.: US 9,263,974 B1
(45) Date of Patent: Feb. 16, 2016

(54) HOVER ENGINE FOR A HOVERBOARD WHICH GENERATES MAGNETIC LIFT TO CARRY A PERSON

(71) Applicant: Arx Pax, LLC, Saratoga, CA (US)

(72) Inventors: D. Gregory Henderson, Saratoga, CA (US); Shauna Moran, Sunnyvale, CA (US); Mitchell Dougherty, Los Gatos, CA (US); Victor Espinoza, Los Gatos, CA (US); Robert William Melvin, Portland, OR (US); James Janicki, Phoenix, MD (US); David P Olynick, Albany, NY (US)

(73) Assignee: Arx Pax, LLC, Saratoga, CA (US)

( * ) Notice: Subject to any disclaimer, the term of this patent is extended or adjusted under 35 U.S.C. 154(b) by 0 days.

(21) Appl. No.: 14/639,047

(22) Filed: Mar. 4, 2015

Related U.S. Application Data

(63) Continuation-in-part of application No. 14/069,359, filed on Oct. 31, 2013, now Pat. No. 9,148,077.

(60) Provisional application No. 62/066,891, filed on Oct. 21, 2014, provisional application No. 61/977,045, (Continued)

(51) Int. Cl.
*B60L 13/04* (2006.01)
*H02N 15/00* (2006.01)
*H02K 7/09* (2006.01)

(52) U.S. Cl.
CPC ............... *H02N 15/00* (2013.01); *B60L 13/04* (2013.01); *H02K 7/09* (2013.01)

(58) Field of Classification Search
CPC .................. H02K 7/09; H02N 15/00–15/04
USPC ............... 310/90.5, 103, 104; 104/281–283; 180/180
IPC ..................................................... H02K 007/09
See application file for complete search history.

(56) References Cited

U.S. PATENT DOCUMENTS

| | | | |
|---|---|---|---|
| 3,858,521 A | 1/1975 | Atherton |
| 4,027,597 A | 6/1977 | Lang |
| 4,355,276 A | 10/1982 | Vittay |
| 4,578,610 A | 3/1986 | Kliman et al. |
| 5,270,596 A | 12/1993 | Shibuya et al. |

(Continued)

FOREIGN PATENT DOCUMENTS

| | | |
|---|---|---|
| EP | 2371613 A1 | 10/2011 |
| JP | 06335111 A | 12/1994 |

(Continued)

OTHER PUBLICATIONS

Machine Translation, Nishimura, JP 2012019618 A, Jan. 26, 2012.*

(Continued)

*Primary Examiner* — Thomas Truong
(74) *Attorney, Agent, or Firm* — Kwan & Olynick LLP

(57) ABSTRACT

A hoverboard is described. The hoverboard includes four hover engines each including a motor. The motor rotates an arrangement of magnets to induce eddy currents and generate magnetic lift which causes the hoverboard to hover in the air. The hoverboard can be tilted to propel it in a particular direction. The hover engines can each be coupled to a tilt mechanism which is coupled to a flexible rider platform. When rider platform is flexed via rider induced forces, the hover engines can be tilted individually to provide translational forces.

28 Claims, 18 Drawing Sheets

Related U.S. Application Data filed on Apr. 8, 2014, provisional application No. 62/011,011, filed on Jun. 11, 2014, provisional application No. 62/031,756, filed on Jul. 31, 2014, provisional application No. 61/799,695, filed on Mar. 15, 2013.

(56) References Cited

U.S. PATENT DOCUMENTS

| | | | |
|---|---|---|---|
| 5,467,718 | A | 11/1995 | Shibata et al. |
| 5,495,221 | A | 2/1996 | Post |
| 5,705,902 | A | 1/1998 | Merritt et al. |
| 5,722,326 | A | 3/1998 | Post |
| 5,821,658 | A | 10/1998 | Boggs, III |
| 5,847,480 | A | 12/1998 | Post |
| 6,191,515 | B1 | 2/2001 | Post |
| 6,298,318 | B1 | 10/2001 | Lin |
| 6,503,318 | B2 | 1/2003 | Pye et al. |
| 6,564,882 | B2 | 5/2003 | Durmeyer et al. |
| 6,629,503 | B2 | 10/2003 | Post |
| 6,657,344 | B2 | 12/2003 | Post |
| 6,792,335 | B2 | 9/2004 | Ross |
| 6,858,962 | B2 | 2/2005 | Post |
| 7,122,923 | B2 | 10/2006 | Lafontaine et al. |
| 7,559,384 | B2 | 7/2009 | Palladino |
| 7,598,646 | B2 | 10/2009 | Cleveland |
| 8,009,001 | B1 | 8/2011 | Cleveland |
| 8,294,316 | B2 | 10/2012 | Blackwelder et al. |
| 9,126,487 | B2 | 9/2015 | Henderson et al. |
| 9,148,077 | B2 | 9/2015 | Henderson |
| 2002/0084705 | A1 | 7/2002 | Kawamura |
| 2007/0166110 | A1 | 7/2007 | Kenady |
| 2007/0222304 | A1 | 9/2007 | Jajtic et al. |
| 2009/0229487 | A1 | 9/2009 | Crawford et al. |
| 2011/0272398 | A1 | 11/2011 | Berdut Teruel |
| 2013/0020895 | A1 | 1/2013 | Scalzo et al. |
| 2014/0265690 | A1 | 9/2014 | Henderson |
| 2015/0175031 | A1 | 6/2015 | Henderson et al. |

FOREIGN PATENT DOCUMENTS

| | | | |
|---|---|---|---|
| JP | H09261805 A | | 10/1997 |
| JP | 2004534496 A | | 11/2004 |
| JP | 2007215264 A | | 8/2007 |
| JP | 2012019618 A | * | 1/2012 |
| KR | 1020050078514 A | | 8/2005 |
| KR | 1020100045720 A | | 5/2010 |
| WO | 2009054937 A2 | | 4/2009 |
| WO | 2014149626 A1 | | 9/2014 |
| WO | 2015191935 A1 | | 12/2015 |

OTHER PUBLICATIONS

"U.S. Appl. No. 14/069,359, Non Final Office Action mailed May 14, 2015".

"U.S. Appl. No. 14/639,045, Examiner Interview Summary mailed May 1, 2015".

"U.S. Appl. No. 14/639,045, Examiner Interview Summary mailed Jun. 9, 2015".

"U.S. Appl. No. 14/639,045, Examiner Interview Summary mailed Jul. 14, 2015".

"U.S. Appl. No. 14/639,045, Non Final Office Action mailed Apr. 20, 2015".

"Int'l Application Serial No. PCT/US2015/024777, Search Report mailed Jul. 14, 2015".

"Video Publication", SFEnergy, Hoverboard & Hovercar maglev (magnetic levitation board & car), Oct. 9, 2011, https://www.youtube.com/watch?v=uHEQgjNcFBot., Oct. 9, 2011.

"Video Publication", SFEnergy, 작업중 3 Apr. 24, 2011, https://www.youtube.com/watch?v=2qhVjBddRr4t., Apr. 24, 2011.

"U.S. Appl. No. 14/069,359, Advisory Action mailed Dec. 1, 2014".

"U.S. Appl. No. 14/069,359, Examiner Interview Summary mailed Jul. 1, 2014".

"U.S. Appl. No. 14/069,359, Examiner Interview Summary mailed Oct. 30, 2014".

"U.S. Appl. No. 14/069,359, Final Office Action mailed Oct. 10, 2014".

"U.S. Appl. No. 14/069,359, Non Final Office Action mailed Apr. 28, 2014".

"Int'l Application Serial No. PCT/US2014/019956, Search Report and Written Opinion mailed Jun. 24, 2014".

"Launchpoint Technologies 6" Dual Halbach Air-core Motor, Revision 1.0, Retrieved from the Internet <http://www.launchpnt.com/Portals/53140/docs/dual-halbach-motor-data-sheet_r1.pdf>.

"The 25 Best Inventions of 2014: Hoverboards, intelligent space craft, edible food wrappers, and much much more", Time Magazine, <http://time.com/3594971/the-25-best-inventions-of-2014/>, Nov. 20, 2014.

Allain, Rhett, "The Physics of the Hendo Hoverboard", WIRED <http://www.wired.com/2014/10/physics-hendo-hoverboard/>, Oct. 24, 2014.

Begley, Laura B., "Skateboarding Legend Tony Hawk Test Drives the World's First Hoverboard", Yahoo <https://www.yahoo.com/travel/skateboarding-legend-tony-hawk-test-drives-the-worlds-102899995187.html>, Nov. 17, 2014.

Constine, Josh, "How It Feels to Ride a real Hoverboard", techcrunch.com <http://techcrunch.com/2014/12/07/an-elevated-experience/>, Dec. 7, 2014.

Dougherty, Conor, "Hoverboard? Still in the Future", The New York Times <http://www.bytimes.com/2014,10/21/technology/hoverboard-still-in-future.html?_r=1, Jan. 21, 2015, 4.

Eichenberg, Dennis J. et al., "Deverlopment and Testing of an Axial Halbach Magnetic Bearing", NASA, Jul. 2006, 30 pgs.

Ham, Chan et al., "Study of a Hybrid Magnet Array for an Electrodynamic Maglev Control", Journal of Magnetics, vol. 18, No. 3., Sep. 2013, 370-374.

Hoburg, J.F. et al., "A Laminated Track for the Inductrack System: Theory and Experiment", 18th International Conference on Magnetically Levitated Systems and Linear Drives, Shanghai, China, Jan. 13, 2004, 5 pgs.

Lavelle, Marianne, "Four 2015 Energy Ideas 'Back to the Future' Got (Almost) Right", National Geographic <http://news.nationalgeographic.com/news/energy/2014/12/141224-back-to-the-future-energy-hoverboards-flying-cars/>, Dec. 23, 2014.

Palermo, Elizabeth, "Look Ma, No Hands! Here's How This Supercool Hoverboard Works", livescience <http://www.livescience.com/49105-how-hoverboards-work.html>, Dec. 12, 2014, 4.

Paudel, N et al., "General 2-D Transient Eddy Current Force Equations for a Magnetic Source Moving Above a Conductive Plate", Progress in Electromeagnetics Research B. vol. 43, 255-277, 2012, 2012, 23 pgs.

Paudel, N et al., "Modeling the Dynamic Electromechanical Suspension Behavior of an Electrodynamic Eddy Current Maglev Device", Progress in Electromagnetics Research B, vol. 49, 1-30, 2013, 2013, 30 pgs.

Post, Richard F. et al., "The Design of Halbach Arrays for Inductrack Maglev Systems", 6 pgs.

Post, Richard F., "The Inductrack: A Simpler Approach to Magnetic Levitation", IEEE Transactions on Applied Superconductivity, vol. 10, n. I, doi:IO.II09/77.828377, Lawrence Livermore National Laboratory, Livermore CA, Mar. 2000, 901-904.

Ricci, Mike, "High Efficiency, High Power Density Electric Motors", Launchpoint Technologies, Retrieved from the Internet <http://www.google.com/url?sa=t&rct=j&q=&esrc=s&source=web&cd=3&ved=0CFIQFjAC&url=http%3A%2F%2Fwww.launchpnt.com%2FPortals%2F53140%2Fdocs%2Flaunchpoint-halbach-motor-presentation-2010.ppt&ei=vJByUv2sNMTlygGLxIGIBg&usg=AFQjCNG5_F, Jul. 27, 2010, 12 pgs.

Santus, Rex, "Tony Hawk rides a hoverboard, for real this time", Mashable <http://mashable.com/2014/11/18/tony-hawk-hoverboard-real/, Nov. 18, 2014, 3.

(56) References Cited

OTHER PUBLICATIONS

Stuart, Emma, "Back to the Future's technology predictions", Engineering and Technology Magazine <http://eandt.theiet.org/explore/students/2015/back-to-the-future-transport-technology.cfm>, Jan. 21, 2015.

"U.S. Appl. No. 14/069,359, Notice of Allowance mailed Aug. 20, 2015".
"U.S. Appl. No. 14/639,045, Notice of Allowance mailed Jul. 27, 2015".
"Int'l Application Serial No. PCT/US2015/035442, Search Report and Written Opinion mailed Aug. 27, 2015".

* cited by examiner

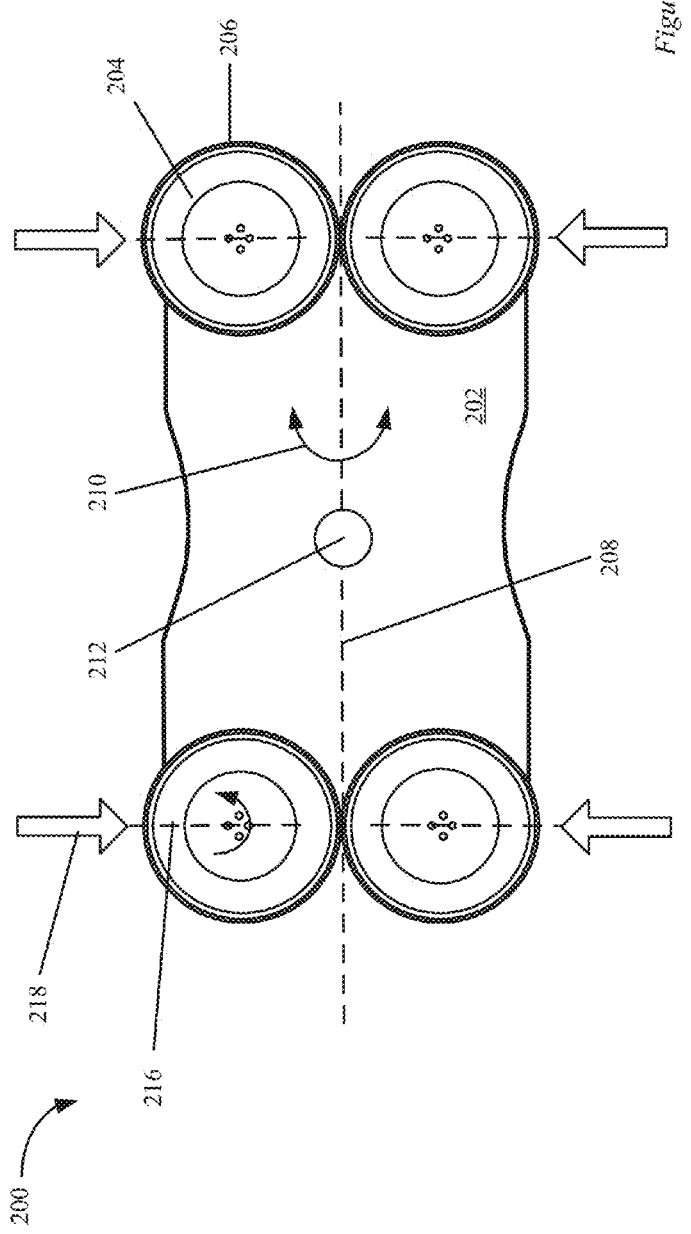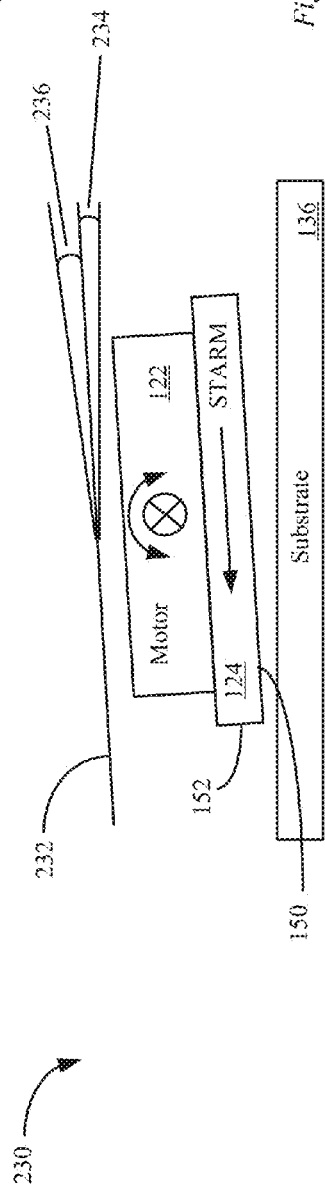
Figure 6
Figure 7

HOVER ENGINE FOR A HOVERBOARD WHICH GENERATES MAGNETIC LIFT TO CARRY A PERSON

CROSS-REFERENCE TO RELATED APPLICATIONS

This patent application claims priority under 35 U.S.C. §119(e) to U.S. Provisional Patent Application No. 62/066,891, filed Oct. 21, 2014, entitled "Hoverboard," by Henderson et al, which is incorporated by reference in its entirety for all purposes herein. This patent application claims priority under 35 U.S.C. §119(e) to U.S. Provisional Patent Application No. 61/977,045, filed Apr. 8, 2014, entitled "Applications of Magnet Arrangements having One-Sided Flux Distribution," by Henderson et al, which is incorporated by reference in its entirety for all purposes herein. This patent application claims priority under 35 U.S.C. §119(e) to U.S. Provisional Patent Application No. 62/011,011, filed Jun. 11, 2014, entitled "Applications of Magnet Arrangements having a One-sided Magnetic Flux Distribution," by Henderson et al, which is incorporated by reference in its entirety for all purposes herein. This patent application claims priority under 35 U.S.C. §119(e) to U.S. Provisional Patent Application No. 62/031,756, filed Jul. 31, 2014, entitled "Propulsion and Control for a Magnetically Lifted Vehicle," by Henderson et al, which is incorporated by reference in its entirety for all purposes herein. This application claims priority under 35 U.S.C. §120 and is a continuation-in-part of U.S. patent application Ser. No. 14/069,359, entitled "Magnetic Levitation of a Stationary or Moving Object," filed Oct. 31, 2013, by Henderson, which claims priority under 35 U.S.C. §119(e) to U.S. Provisional Patent Application Ser. No. 61/799,695, entitled "Stationary Magnetic Levitation" by Henderson, filed Mar. 15, 2013 each of which are incorporated by reference in their entirety and for all purposes.

FIELD OF THE INVENTION

This invention generally relates to electromagnetic levitation systems, and more particularly to a hoverboard, which employs electromagnetic levitation.

BACKGROUND

Prior to October 2014, Wikipedia, the online encyclopedia, described a hoverboard as a fictional levitating (hovering) board used for personal transportation in the films "Back to the Future Part II" and "Back to the Future Part III." Hoverboards resemble a skateboard without wheels. Through special effects the film-makers depicted the boards hovering above the ground.

Since these movies, people have dreamed of riding a hoverboard. A few groups have claimed to have created a hoverboard. However, the devices have proven to be elaborate hoaxes. As follows, a hoverboard, which uses magnetic forces to hover, is described.

SUMMARY

A hoverboard is described. The hoverboard generates magnetic forces which can be used to lift and propel the hoverboard. The magnetic forces are generated using one or more hover engines. In one embodiment, the hover engines each include an electric motor which is configured to rotate an array of magnets. The rotating array of magnets is configured to induce eddy currents in a conductive substrate. The induced eddy currents generate a magnetic field which repels the magnets in the hover engine which causes the hoverboard to hover in the air.

In one embodiment, the hoverboard includes four hover engines and rider platform. A rider can stand on the rider platform to rider the hoverboard. In flight, a rider can shift their position and weight on the rider platform to tilt the entire hoverboard and propel the hoverboard in a particular direction. The translational forces which are generated may be sufficient to allow the hoverboard to climb or hold itself in position on an inclined surface. In addition, mechanisms can be provided which allow the hover engines to be individually tilted to control a balance of forces acting on the hoverboard. For example, mechanical linkages can be provided which allow the rider to input forces which actuate one or more of the tilt mechanisms at a time to more finely control a direction of the hoverboard.

In a particular embodiment, the hoverboard can be characterized as including two or more hover engines. Each of the hover engines can have an electric motor, an electronic speed controller, a starm and a shroud. The electric motor can include a winding, a first set of permanent magnets and a first structure which holds the first permanent magnets where an electric current is applied to the winding to cause one of the winding or the first set of permanent magnets to rotate.

The electronic speed controller can control a rotation rate of the electric motor. The starm can be configured to receive a rotational torque from the electric motor which rotates the starm. The shroud can enclose the electric motor and at least a top portion of the starm.

The STARM can include a second set of permanent magnets and a second structure which holds the second set of permanent magnets. The second set of permanent magnets can be rotated to induce eddy currents in a substrate such that the induced eddy currents and the second set of permanent magnets interact to generate forces which cause the hoverboard and a rider riding on the hoverboard to hover and translate from location to location along the substrate. The hoverboard can be configured to accommodate complex motions involving simultaneous rotation and translation.

A rider platform on which the person rides can have a front end and a back end. A first hover engine can be mounted beneath the rider platform proximate to the front end and a second hover engine can be mounted beneath the rider platform proximate to the back end of the rider platform. In addition, an electric power source that outputs the electric current to the two or more hover engines can be mounted beneath the rider platform between the first hover engine and the second hover engine.

In particular embodiments, a mechanical hinge can be coupled to a first hover engine which allows the starm, the electric motor and the shroud of the first hover engine to tilt relative to the rider platform. A magnitude of a translational force, output from the first hover engine, can change in response to tilting the starm, the electric motor and the shroud. The translation force may be used to control an orientation of the hoverboard. A tilt mechanism can be coupled to the first hover engine configured to receive an external force and/or generate an internal force which tilts the first hover engine in response to an input force generated by the person.

Another embodiment can be characterized as a magnetic lifting device. The magnetic lifting can include one or more hover engines, an electric power source and a structure for holding the one or more hover engines and the electric power source. Each hover engine can include an electric motor, an electronic speed controller and a starm. The electronic speed controller is typically electronically disposed between the electric motor and the electric power source. It can control the power reaching the electric motor to control a rotation rate of the motor.

The electric motor can include a winding, a first set of permanent magnets and a first structure which holds the first permanent magnets where an electric current is applied to the winding to cause one of the winding or the first set of permanent magnets to rotate. The starm can be configured to receive a rotational torque from the electric motor which rotates the starm. The starm can include a second set of permanent magnets and a second structure which holds the second set of permanent magnets wherein the second set of permanent magnets are rotated to induce eddy currents in a substrate such that the induced eddy currents and the second set of permanent magnets interact to generate forces which allow the magnetic lifting device to hover and translate freely in any direction above the substrate.

BRIEF DESCRIPTION OF THE DRAWINGS

The included drawings are for illustrative purposes and serve only to provide examples of possible structures and process steps for the disclosed inventive systems and methods. These drawings in no way limit any changes in form and detail that may be made to the invention by one skilled in the art without departing from the spirit and scope of the invention.

FIG. 6 is a bottom view of a hoverboard with hover engines which tilt in accordance with the described embodiments.

FIG. 7 is a side view of a hover engine in a tilt position in accordance with the described embodiments.

DESCRIPTION OF THE PREFERRED EMBODIMENTS

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

With respect to the following figures a hoverboard is described. The hoverboard is configured to generate lift using magnetic forces. In particular embodiments, an individual can ride the hoverboard in a manner akin to riding a skateboard, surfboard or snowboard, i.e., use their body movements to control a motion of the device. However, unlike these devices, the hoverboard can generate its own propulsive forces. Thus, propulsion of the device is not solely dependent on user generated forces, gravity or wave energy.

In addition, while hovering, the friction related forces are very low. Thus, the hoverboard can be configured to offer a greater range of movement and more maneuverability as compared to a skateboard, surfboard or snowboard. Details of a hoverboard are described with respect to FIGS. 1-15. In particular with respect to FIG. 1, an individual riding a hoverboard is illustrated. With respect to FIGS. 2 and 3, two arrangements of magnets which can be used to generate magnetic lift and their interaction with a conductive substrate are described.

Figure 4A:
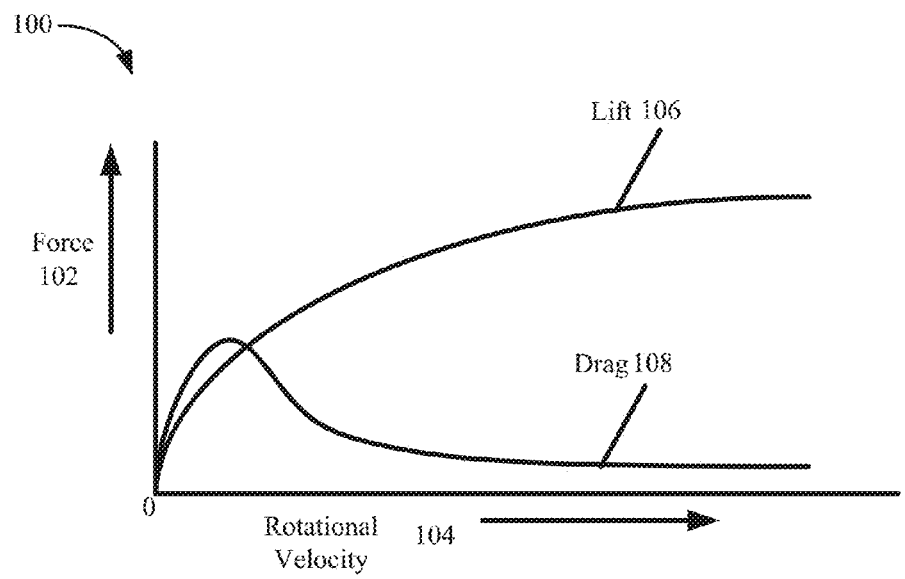
FIG. 4A is a plot of lift and drag curves associated with an arrangement of rotating magnets in accordance with the described embodiments.

With respect to FIG. 4A, lift and drag generated as a function of RPM is discussed. With respect of FIG. 4B, lift as a function of distance from a conductive substrate is discussed. Lift as function of RPM and the thickness of the conductive substrate is described with respect to FIG. 4C.

Propulsive and control forces which can be generated from a hover engine, such as a hover engine coupled to hoverboard, are described with respect to FIGS. 6 and 7. With respect to FIGS. 8A, 8B and 8C, a STARM and motor configuration which can be used to form a hover engine are discussed. Two hoverboard configurations are described with respect to FIGS. 9-13. Additional hoverboard configurations are described with respect to FIGS. 22A to 25.

Figure 14:
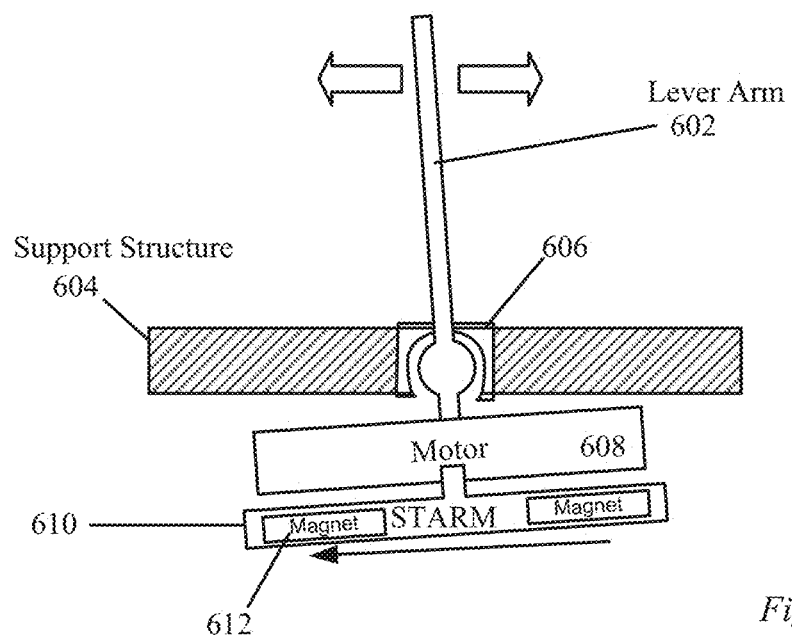
FIG. 14 is an illustration of a hover engine coupled to a lever arm in accordance with the described embodiments.
Figure 15:
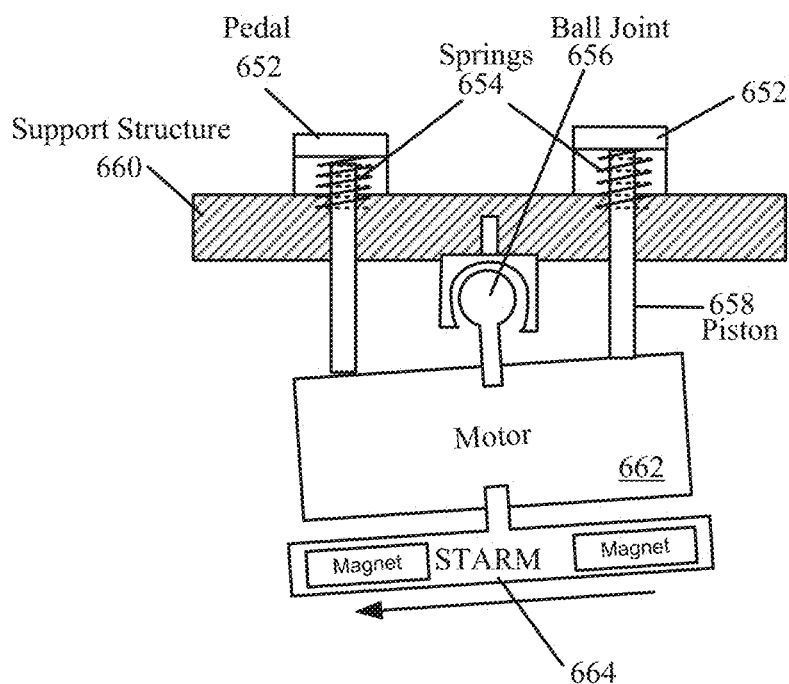
FIG. 15 is an illustration of a hover engine coupled to foot pedals in accordance with the described embodiments.
Figure 16:
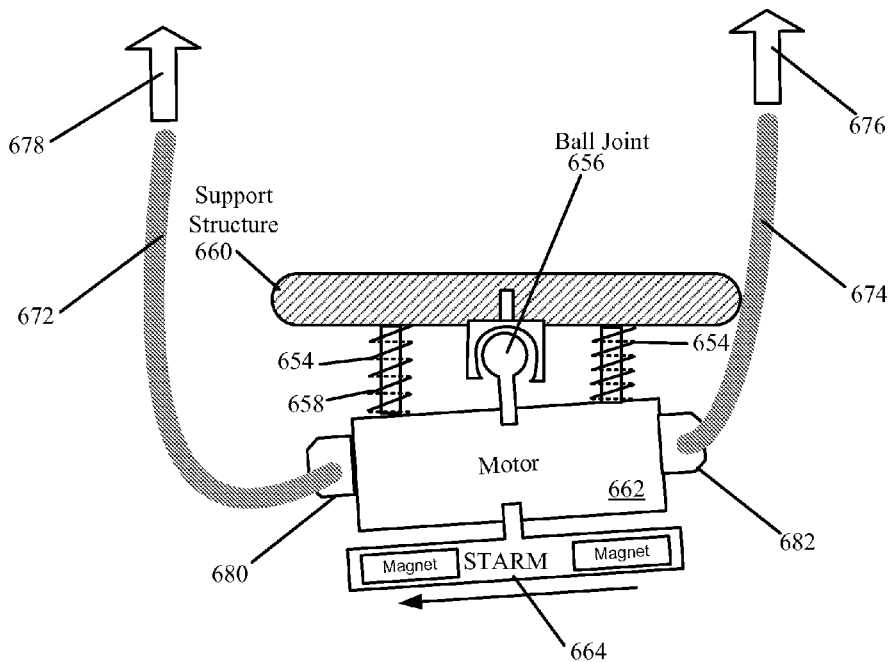
FIG. 16 is an illustration of a hover engine coupled to reins in accordance with the described embodiments.

With respect to FIGS. 14-16 analog and digital mechanisms used to move a hover engine for control and propulsive purposes are described. With respect to FIGS. 17A-17E shroud configuration for hover engines are discussed. Finally, integration configurations of rotatable hover engines to a payload platform are described with respect to FIGS. 18A-21.

Although many of the embodiments described herein are discussed in the context of a hoverboard which is ridden by a person, various aspects of the embodiments are also applicable to many other types of electromagnetic lifting devices. For example, hover engines which tilt can be used to propel and lift electromagnetic lifting devices which are not necessarily configured to carry a person. As another example, the motor and STARM (STator and ARMature) configurations described herein can be used in electromagnetic lifting devices configured to lift a pallet. Other examples electromagnetic lifting devices and applications are provided in the provisional patent applications and utility patent applications previously incorporated herein by reference. Thus, the example of a human controlled hoverboard is provided for the purposes of illustration and is not meant to be limiting.

Hoverboard System and Operation

With respect to FIGS. 1 to 5B, some general examples and operating principles of a hoverboard system are described. The hoverboard system can include a hoverboard having hover engines and a substrate on which the hoverboard operates. The substrate can include a conductive portion in which eddy currents are induced. The electromagnetic interaction between the device which induces the eddy currents and the induced eddy currents can be used to generate electromagnetic lift and various translational and rotational control forces.

Figure 1:
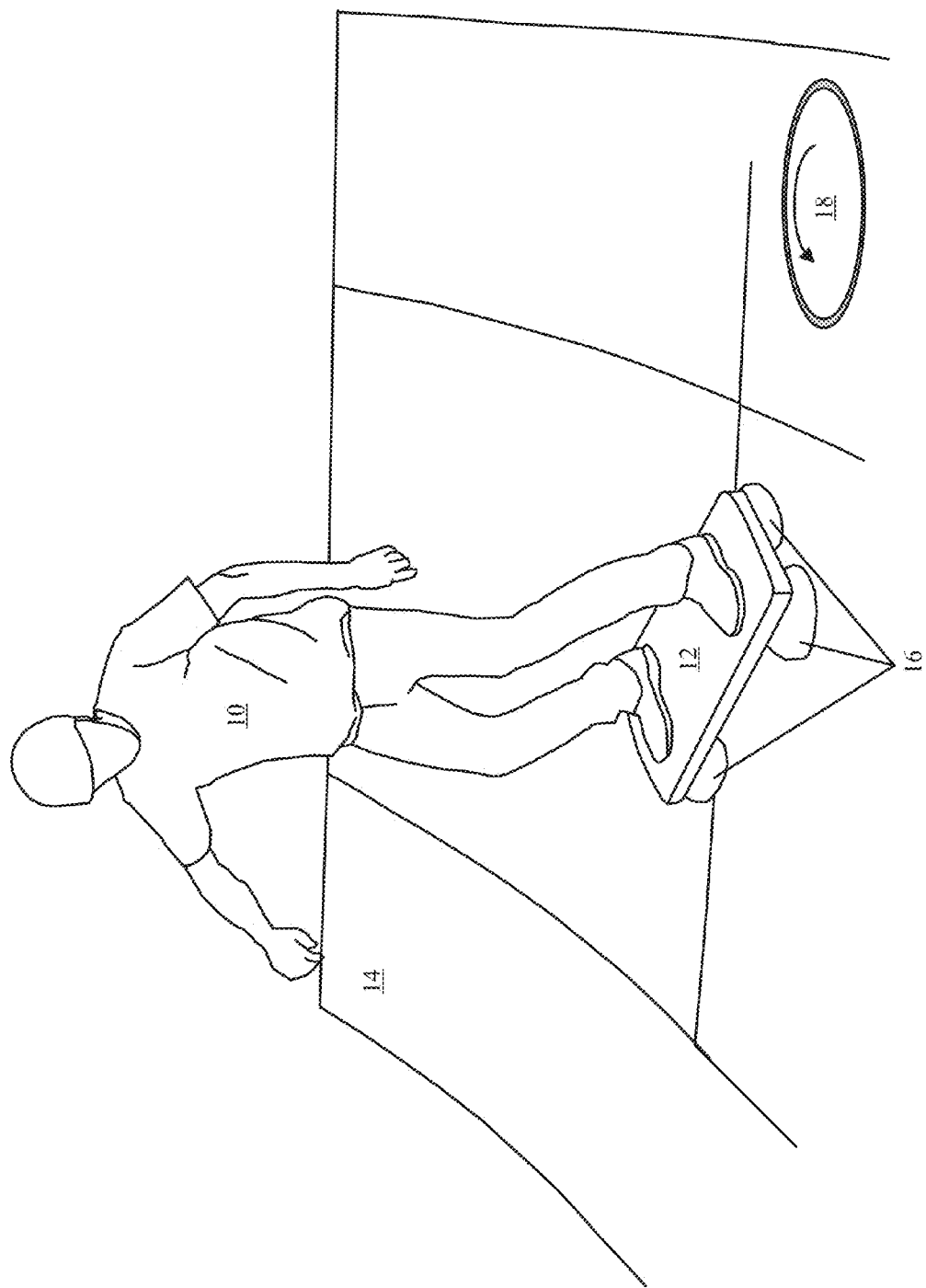
FIG. 1 is an illustration of a person riding a hoverboard in accordance with the described embodiments.

FIG. 1 is an illustration of a person 10 riding a hoverboard 12. In one embodiment, the hoverboard includes four hover engines, such as 16. The hover engines 16 generate a magnetic field which changes as function of time. The time varying magnetic field interacts with a conductive material in track 14 to form eddy currents. The eddy currents and their associated magnetic fields and the magnetic fields from the hover engine interact to generate forces, such as a lifting force or a propulsive force. Examples of eddy currents which can be generated are described with respect to FIGS. 2 and 3. Lift and drag associated with induced eddy currents is described with respect to FIGS. 4A-4C.

In FIG. 1, the track 14 is formed from copper. In particular, three one eighth inch sheets of copper layered on top of one another are used. Other conductive materials can be used and copper is described for the purposes of illustration only. Curved surfaces may be formed more easily using a number of layered thin sheets. For example, a half-pipe can be formed. In FIG. 1, a portion of a half-pipe is shown. The track 14 can include various sloped and flat surfaces and the example of half-pipe is provided for illustrative purposes only.

The thickness of the conductive material which is used can depend on the material properties of the conductive material, such as its current carrying capacity and the amount of magnetic lift which is desired. A particular hover engine, depending on such factors, as the strength of the output magnetic field, the rate of movement of the magnetic field and the distance of the hover engine from the surface of a track can induce stronger or weaker eddy currents in a particular track material. Different hover engines can be configured to generate different amounts of lifts and thus, induce stronger or weaker eddy currents.

The current density associated with induced eddy currents in the material can be a maximum at the surface and then can decrease with the distance from the surface. In one embodiment, the current density which is induced at the surface can be on the order of one to ten thousand amps per centimeter squared. As the conductive material becomes thinner, it can reach a thickness where the amount of current potentially induced by the hover engine is more than the conductive material can hold. At this point, the amount of magnetic lift output from the hover engine can drop relative to the amount of lift which would be potentially generated if the conductive material was thicker. This effect is discussed in more detail with respect to FIG. 4C.

As the thickness of the material increases, the induced currents become smaller and smaller with increasing distance from the surface. After a certain thickness is reached, additional material results in very little additional lift. For the hover engines used for the hoverboard 12, simulations indicated that using ½ inch of copper would not produce much more lift relative to using ⅜ inch of copper.

For the device shown in FIG. 1, simulations predicted that using only ⅛ inch sheet of copper would significantly lower the lift versus using a half inch of copper. In various embodiments, the amount of copper which can be used varied depending on the application. For example, for a small scale model of a hoverboard configured to carry a doll, a ⅛ inch sheet of copper may be more than sufficient. As another example, a track with a thinner amount of conductive material can lead to less efficient lift generation as compared to track with a thicker amount of a more conductive material. However, the cost of the conductive material can be traded against the efficiency of lift generation.

A substrate 14 can include a portion which is configured to support induced eddy currents. In addition, it can include portions used to add mechanical support or stiffness, to provide cooling and/or to allow a track portions to be assembled. For example, pipes or fins can be provided which are configured to remove and/or move heat to a particular location. In another example, the substrate 14 can be formed as a plurality of tiles which are configured to interface with one another. In yet another example, the portion of the substrate 14 which is used to support the induced eddy currents may be relatively thin and additional materials may be added to provide structural support and stiffness.

In various embodiments, the portion of the substrate 14 used to support induced eddy currents may be relatively homogenous in that its properties are substantially homogeneous in depth and from location to location. For example, a solid sheet of metal, such as silver, copper or aluminum can be considered substantially homogenous in it's in depth properties and from location to location. As another example, a conductive composite material, such as a polymer or composite, can be used where the material properties on average are relatively homogeneous from location to location and in depth.

In other embodiments, the portion of the substrate 14 used to support the induced eddy currents can vary in depth but may be relatively homogeneous from location to location. For example, the portion of the substrate 14 which supports the eddy currents can be formed from a base material which is doped with another material. The amount of doping can vary in depth such that the material properties vary in depth.

In other embodiments, the portion of the substrate 14 which supports the eddy currents can be formed from layers of different materials. For example, an electric insulator may be used between layers of a conductive material, such as layers of copper insulated from one another. In another example, one or more layers of a ferromagnetic material can be used with one or more paramagnetic materials or diamagnetic materials.

In yet another example, the surface of the substrate 14 which supports the eddy currents can include a surface structure, such as raised or sunken dimples which effect induced eddy currents or some other material property. Thus, from location to location there may be slight variations in material properties but averaged over a particular area the material properties may be relatively homogeneous from location to location.

An advantage of having relatively homogeneous material properties from location to location is that the lift and drag which are generated on average will be relatively the same independent of which direction the hoverboard translates along the surface. In other embodiments, the material properties can be varied from location to location to change the local lift and drag characteristics associated with the hoverboard as it moves in a particular direction. Configurations where the material properties vary can be used to challenge the rider and make the ride more interesting. For example, tiles with different material properties might be interlinked, such as copper and aluminum tiles, to simulate an effect such as moguls in skiing.

In another example, the track can be thinned out in certain location. The effect of a thinner track can result in the local lift to drop and the amount of drag to increase. Imbalances in drag forces output from a STARM can be used to generate translational forces which propel a hoverboard. Thus, a local increase in drag resulting from a local thinning of the portion of the substrate 14 can be used to provide a location translational speed boost. This speed boost might be used before an upward slope or on upward slope to help the hoverboard or some other type of electromagnetic lifting device to climb the slope.

In one embodiment, a section, such as 18, of the portion of the substrate which supports the induced eddy currents can be configured to rotate. The rotation of the section can be driven by a motor located beneath the substrate. For example, a circular disk, whose top is flush with the top of the surrounding substrate, can be configured to rotate while the surrounding substrate remains in a fixed position.

As will be discussed in more detail below with respect to FIGS. 2-4C, the properties of the induced eddy currents depend on the motion of the magnets relative to the portion of the substrate which supports the induced eddy currents. Thus, a change in the relative motion between the magnets and the substrate can change the local lift and drag properties output from a hover engine. For example, the rotation of the substrate can be used to locally enhance lift and drag or locally reduce lift and drag on the portion of the substrate which is rotating.

In one embodiment, a plurality of sections of the substrate can be configured to rotate. The plurality of sections can be configured to align with one or more hover engines of a hoverboard, i.e., the hover engine can be placed over the top of the rotating section. For example, a hoverboard can include four hover engines and four sections of rotating substrate can be provided which align with the four engines. In another example, a hoverboard can include eight hover engines and four sections of rotating substrate can be provided which align with only four of the hover engines.

A section of rotating substrate can be used in conjunction with a hover engine during a start-up phase where a hover engine is at rest and its STARM is not rotating. In one embodiment, the rotating substrate can be operated to reduce the drag torque a motor experiences during start-up. As described in more detail with respect to FIG. 4A, starting from rest, the drag can increase with increasing RPM, reach a peak, and then decrease with increasing RPM. As described with respect to FIG. 4B, lift and drag decrease exponentially as the distance of the hover engine from the surface of the substrate increases. Thus, the rotating substrate can be used to help overcome the start-up conditions when the RPM is low and drag is high and/or when the hover engine is close to the surface and drag is high.

An advantage of this approach is that may lessen the torque requirements associated with the motor. The lower torque requirements may allow a less powerful motor to be used. A less powerful motor may provide more flight time because less power is expended by the motor during start-up and the motor may weigh less.

For example, one or more rotating sections of the substrate can be spun up in a direction opposite of the direction that the hover engine spins. Initially, the hover engine may remain at rest. In one embodiment, the substrate can be rotated fast enough to generate lift, such as spun up to the operational RPM of the hover engine. Then, the hover engine can be spun up while the substrate is spun down such that a constant relative RPM is maintained between the substrate which supports the induced eddy currents and the magnets in the hover engine. When the selected constant relative RPM is greater than the RPM where the peak drag torque occurs, then the maximum drag torque experienced by the motor will be less than if it was spun up over a non-rotating surface.

If enough lift is generated by the rotating substrate, the hoverboard will rise to a particular height before the motor is started. As described above, the drag torque can drop exponentially with distance from the surface. If the hover engine is started after the particular height is reached, the maximum torque experienced by the hover engine will have dropped exponentially depending on the actual height which has been reached.

In a particular embodiment, an enclosure can be provided around one or more portions of substrate which rotate. A hoverboard can be placed in the enclosure and lifted as a result of the rotation of the substrate and then the hoverboard engines can be started such that the lift force generation is transferred from the rotating substrate to the hover engines. The enclosure can keep the hoverboard in position during this process. Then, a rider can then step on the hoverboard and one end of the enclosure can be opened to allow the hoverboard to depart from the enclosure.

The process described above can be used in reverse to lower the hoverboard to a resting position. First, all or a portion of the lift forces can be transferred from the hover engines to the rotating substrate by spinning down the hover engines while spinning up the rotating substrate. During this process, the hoverboard may hover at approximately a constant height. As described above, the transfer may involve having the rotating substrate generate all or a portion of the relative velocity between the magnets of the hover engine and the substrate. Then, the hover engines alone or in combination with the rotating substrate can be used to lower the hoverboard to a position on the ground where the hover engines are brought to rest.

In one embodiment, a logic device, such as an on-board processor, on the hoverboard can be configured to communicate with a logic device which controls the rotation rate of one or more sections or rotating substrate. The devices can communicate to allow some relative RPM profile to be generated. In one embodiment, the logic device on the hoverboard or the logic device controlling the rotating substrate sections may be configured to temporarily control the hover engines and the rotating substrate sections to implement a relative RPM profile. In another embodiment, the logic device can be configured to sample the rotation rates of the various rotating components and develop RPM profile in real-time.

In another embodiment, the logic device on the hoverboard can be configured to implement a start-up RPM profiles for its hover engines where this profile is implemented in response to receiving a command from a remote device or detecting an actuation of a mechanical device, such as a switch or button. The logic device controlling the rotating sections of the substrate can also be configured with one or more start-up RPM profiles where a start-up profile is implemented in response to receiving a command from a remote device or detecting actuation of a mechanical device, such as switch or button. The hoverboard and rotating sections of substrate can be each commanded to enter into a start-up mode in some order to generate a relative RPM profile between the hoverboard and the one or more sections of rotating substrate.

Various relative rotational rate profiles can be generated between a hover engine and a section of rotating substrate. Thus, the example of spinning up a section of rotating substrate to an operational rotation rate of the hover engine while the hover engine remains at rest and then maintaining a constant relative rotation rate between the devices as the hover engine spins up is provided for the purposes of illustration only and is not meant to be limiting. For example, a hover engine and a rotating substrate can be operated to generate a relative rotation rate profile with a peak that is greater than the operational rotation rate of the hover engine. The maximum relative rotation rate can be first generated and then devices can be controlled such that the operational rotation rate is approached from above as the rotation rates of each device are adjusted.

Returning to FIG. 1, the person can control the hoverboard 12 by shifting their weight and their position on the hoverboard. The shift in weight can change the orientation of one or more of the hover engines 16 relative to the surface of the track 14. The orientation can include a distance of each part of the hover engine from the track. The orientation of each hover engine, such as 16, relative to the surface of the track can result in forces parallel to the surface being generated. Further details, related to the orientation of a hover engine and the associated forces which are generated are described with respect to FIGS. 5A, 5B, 6 and 7 and 24 and 25.

The net force from the hover engines 16 can be used to propel the vehicle in a particular direction and control its spin. In addition, the individual may be able to lean down and push off the surface 14 to propel the hoverboard 12 in a particular direction or push and then jump onto to the hoverboard 12 to get it moving in a particular direction.

In other embodiments, as described in more detail with respect to FIGS. 9-15, mechanisms can be provided which allow the direct control of one or more hover engines separately from the other hover engines. The control mechanisms can be analog, digital or combinations thereof. An analog control mechanism can receive a user supplied force. In the mechanism, the user supplied force can be transferred to the hover engine such that the user supplied force affects an orientation of the hover engine. The orientation of the hover engine can cause a force to be generated in a particular direction.

A digital control mechanism can be configured to detect a movement of a person or a movement of a device by the person. For example, a movement of a person's head, arms or a device held by a person can be detected or a pressure exerted on a sensor in a person's shoe or on the hoverboard 12 can be detected. In one embodiment, multi-axis accelerometer system can be used to detect and quantify an amount of movement. In another embodiment, a camera system can be used to detect and quantify an amount of movement. In yet other embodiments, an optical system, such as a laser system, can be used, to detect position and quantify an amount of movement. Further, wireless systems, which employ triangulation, including GPS can be employed.

The movement or the detected pressure can be converted to a control signal by an onboard processor. The control signal can be sent to a controller, separate from the onboard processor, associated with one or more actuators coupled to a hover engine or a group of hover engines. The control signal can cause the controller to operate the actuators in a manner which changes the orientation of the hover engine.

Digital or analog controls can also be used to control operating parameters of a motor associated with the hover engine. In particular, the power received by the motor and its associated RPMs can be controlled. As is described with respect to FIG. 4, the relative amount of lift and drag generated by a hover engine can be changed in response to a change in an RPM value associated with a hover engine. Next, examples of magnet arrangements, which can be used with a hover engine, are described with respect to FIGS. 2 and 3.

Figure 2:
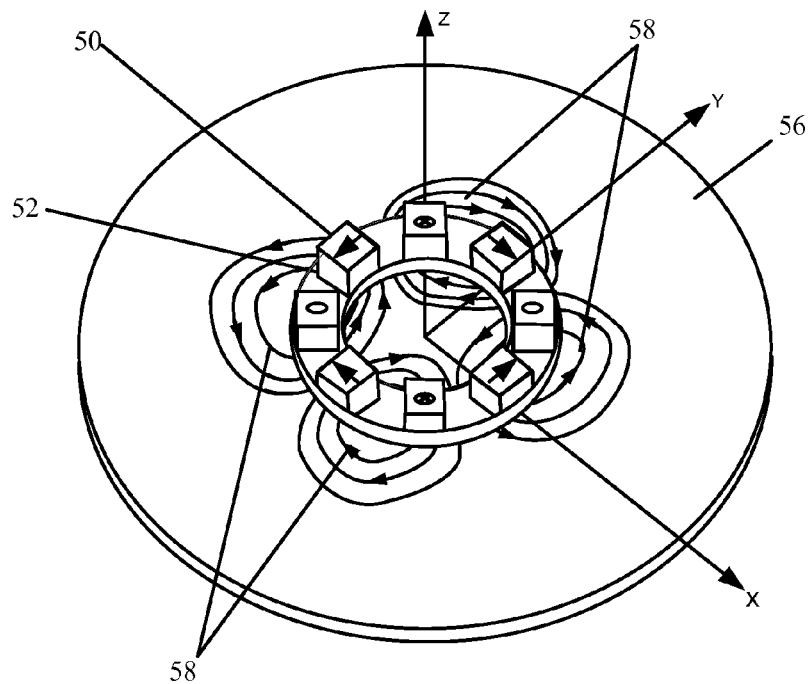
FIGS. 2 and 3 are illustrations of eddy currents generated on a conductive plate in response to arrangements of magnets rotated above the plates in accordance with the described embodiments.
Figure 3:
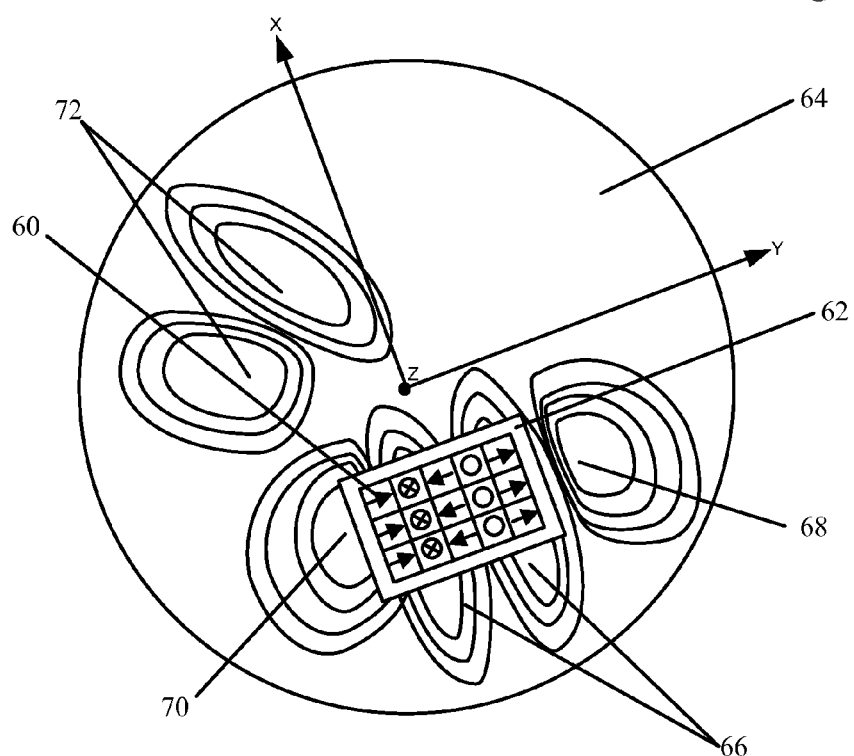

FIGS. 2 and 3 are illustrations of eddy currents generated on a conductive plate in response to arrangements of magnets rotated above the plates. The conductive plate is the portion of the substrate which is configured to support induced eddy currents. The eddy currents and associated forces which are generated were simulated using Ansys Maxwell 3D (Canonsburg, Pa.). In each of the simulations, an arrangement of magnets is rotated at 1500 RPM at ½ inches height above copper plates 56 and 64, respectively. The copper plates are modeled as ½ inch thick. The plate is modeled as being homogeneous in depth and from location to location. The width and length of the plate is selected such that edge effects that can occur when a STARM induces eddy currents near the edge of the plate are minimal.

The magnets are one inch cube Neodymium alloy magnets of strength N50, similar magnets can be purchased via K and J magnetics (Pipersville, Pa.). The magnets weigh about 3.6 ounces each. Magnets of different sizes, shapes and materials can be utilized and this example is provided for the purpose of illustration only.

In FIG. 2, eight one inched cube magnets, such as 50, are arranged with an inner edge about two inches from the z axis. The magnets are modeled as embedded in an aluminum frame 52. The arrow head indicates the north pole of the magnets. The polarities of four of the magnets are perpendicular to the z axis. The open circle indicates a north pole of a magnet and circle with an x indicates a south pole of a magnet. A polarity pattern involving four magnets is repeated twice.

In various embodiments, the polarity pattern of the magnets shown in the figure can be repeated one or more times. One or more magnets of different sizes and shapes can be used to form a volume of magnets which match a polarity direction associated with a polarity pattern. For example, two one half inch wide rectangular magnets with a total volume of one cubic inch or two triangular magnets with a total volume of one cubic inch can be aligned in the same direction to provide a polarity direction in a polarity pattern. In the polarity pattern, a magnets with a polarity direction different than an adjacent magnet may touch the adjacent magnet or may be separate from the adjacent magnet.

For a given number of magnets of a particular cubic size, the distance from the z axis of the face of the magnets can be adjusted such that the magnet's edges are touching or are a small distance apart. With this example using eight magnets, an octagon shape would be formed. A configuration of twenty one inch cube magnets arranged around a circle with the polarity pattern shown in FIG. 2 repeated five times is described with respect to FIGS. 8A and 8B. The inner edge of this arrangement of magnets is about 3.75 inches from the rotational axis.

When the magnets are brought together, the magnitude of the lift and drag which is generated per magnet can be increased relative to when the magnets are spaced farther apart. In one embodiment, trapezoidal shaped magnets can be utilized to allow the magnets to touch one another when arranged around a rotational axis. A different trapezoidal angle can be used to accommodate different total number of magnets, such as four magnets (90 degrees), eight magnets (45 degrees), etc.

A combination of rectangular and triangular shaped magnets can also be used for this purpose. For example, triangular magnets can be placed between the cubic magnets shown in FIG. 2. In one embodiment, the polarity pattern for groups of four trapezoidal magnets or combinations of rectangular and triangular magnets can be similar to what is shown in FIG. 2.

When the arrangement of eight magnets is rotated above the copper plate, eddy currents are induced in the copper. In the example of FIG. 2, the simulation indicates four circular eddy currents 56 are generated. The four eddy currents circle in alternating directions and are approximately centered beneath the circulating magnets. A current circulating in a circular coil generates a magnetic field which looks like a magnetic field of a bar magnet where the orientation (north/south) depends on the direction of the current. The strength of the magnetic field which is generated depends on the area of the circular coil and the amount of current flowing through the coil.

A reaction occurs where the circulating eddy currents generate a magnetic field which repels the arrangement of magnets such that a lifting forces and drag forces are generated. The eddy currents rotate as the magnets rotate. However, the eddy currents are not directly underneath the four magnets aligned with the z axis. Thus, the eddy currents can generate a magnetic field which attracts one of the poles of permanent magnets to which it is adjacent. The attractive force can act perpendicular to the lift to produce drag, which opposes a movement of the magnets. The drag can also be associated with a torque. The drag torque is overcome by an input torque supplied by a motor coupled to the arrangement of magnets.

In this example, there are not well defined circuits. Thus, one eddy current can interact with an adjacent eddy current. The interaction causes the magnitude of the current to increase at the interface between eddy currents such that magnitude of the current varies around circumference of each eddy current. Further, the current also varies in depth into the material with the greatest current per area occurring at the surface and then decreasing in depth in to the surface.

In addition, unlike circuits with a fixed position, the center of the eddy currents rotate as the magnets inducing the currents rotates. Unlike when a magnetic is moved linearly over a conductive material, separate eddy current forms in front of and behind the magnet. In this example, the four poles (magnets with north and south perpendicular to the surface of the plate) are close enough such that the eddy current formed in front of one pole merges with the eddy current formed behind the next adjacent pole. Thus, the number of eddy currents formed is equal to the number of poles which is four. In general, it was observed for this type of configuration that the number of eddy currents which formed was equal to the number of poles used in the magnet configuration.

In addition, material interfaces can affect the induced eddy currents such that an amount of lift and drag which is generated is different near the interfaces as opposed to away from the interfaces. For example, a surface on which eddy currents are induced can have edges where the material which supports the induced eddy currents ends. Near the boundaries, when a STARM approaches an edge, the eddy currents tend to get compressed which affects the resultant lift and drag.

In another example, a surface can have interfaces through which there are discontinuities in the conductivity. For example, edges of two adjacent copper sheets used to form a surface may not touch, may partially touch or may be conductively insulated from one another. The discontinuous conductivity can lessen or prevent current from flowing across the interface which affects the lift and drag generated from the induced eddy currents.

In one embodiment, a substrate which supports induced eddy currents can be formed from a number of sheets which are stacked in layers, such ⅛ inch copper sheets stacked on top of one another. A discontinuity may be formed in one layer where two adjacent sheets meet, such as small gaps between the two sheets which reduce the current which flows from a first sheet to an adjacent second sheet. The gaps may allow for thermal expansion and simplify the assembly process. To lessen the effect of the discontinuity, adjacent edges between sheets can be staggered from layer to layer. Thus, the discontinuity at particular location may occur in one layer but not the other adjacent layers.

In some instances, a conductive paste can be used to improve the conductivity between sheets. In another embodiment, adjacent sheets can be soldered together. In yet another embodiment, flexible contacts, which can be compressed and then expand, can be used to allow current to flow between different sheets.

In FIG. 3, a three row by five column array of one inch cube magnets, such as 60, is rotated above a copper plate. The magnets are modeled as surrounded by an aluminum frame 62. The magnets in this example are configured to touch one another. A magnet pattern for each row of five magnets is shown. In alternate embodiment, a five magnet pattern of open circle, left arrow (pointing to open circle), circle with an "x", right arrow (pointing away from circle with an x) and open circle can be used. This compares to the left arrow, circle with an "x", left arrow, open circle and right arrow pattern shown in the Figure.

The magnet pattern is the same for each row and the magnet polarity is the same for each column. In various embodiments, a magnet array can include one or more rows. For example, a magnet array including only one row of the pattern shown in FIG. 3 can be used.

Multiple arrays with one or more rows can be arranged on a rotating body, such that the rotating body is balanced. For example, magnet arrays of two, three, four, etc. arrays of the same number of magnets can be arranged on a rotating body. In another embodiment, two or more pairs of magnet arrays with a first number of magnets and two or more pairs of magnets arrays with a second number of magnets can be arranged opposite one another on a rotating body.

In the example of FIG. 3, two eddy currents, 66, are generated under the magnet array and two eddy currents 70 and 68 are formed ahead and behind the array. These eddy currents move with the array as the array rotates around the plate. As the array is moved over the plate 64, eddy currents, such as 72 spin off. The eddy currents 66, 68 and 70 generate magnetic fields which can cause magnetic lift and drag on the array. When two of these types of arrays placed close to one another, the simulations indicated that the eddy current induced from one array could merge with the eddy current induced from the other array. This effect diminished as the arrays were spaced farther apart.

Figure 8A:
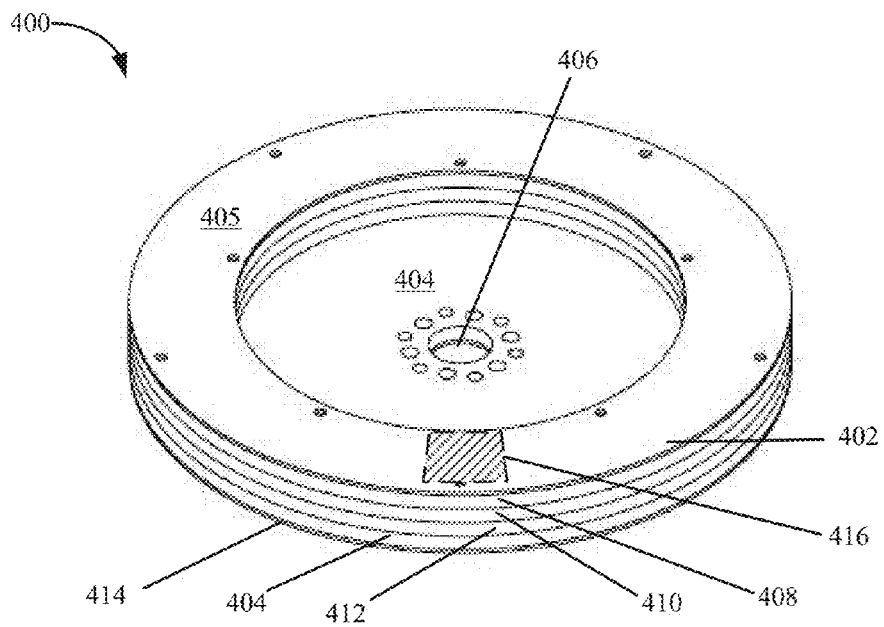
FIG. 8A is a perspective view of a STARM in accordance with the described embodiments.
Figure 8B:
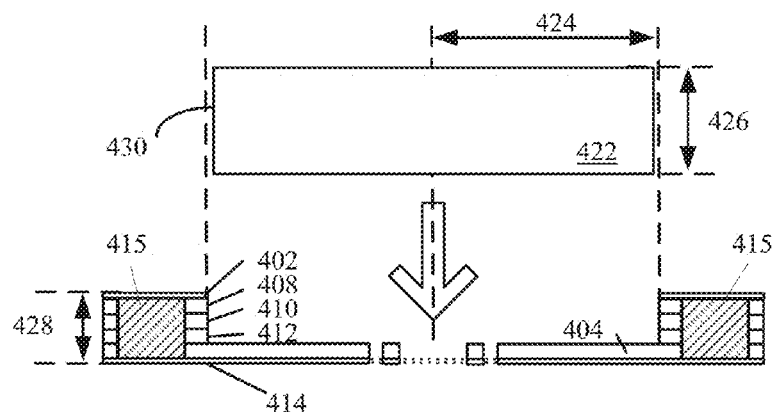
FIG. 8B is a side view of STARM with an embedded motor in accordance with the described embodiments.

In the examples of FIGS. 2 and 3, the simulations indicated that more lift force was generated per magnet in the configuration of FIG. 3 as compared to FIG. 2. Part of this result is attributed to the fact that a portion of the magnets in FIG. 3 is at a greater radius than the magnets in FIG. 2. For a constant RPM, a greater radius results in a greater speed of the magnet relative to the conductive plate which can result in more lift. If it is desirable to arrange the magnets around a motor as shown in FIGS. 8A and 8B and use a disk of smallest diameter, then the configuration in FIG. 2 is more suitable. Thus, in some embodiments, it may be desirable to trade lift generating efficiency for packing efficiency when selecting an arrangement of magnets to utilize.

The lift per magnet can be total lift divided by the total magnet volume in cubic inches. For one inch cube magnets, the volume is one cubic inch. Thus, the total number of magnets is equal to the volume in cubic inches. Hence, the use of lift force per magnet in the previous paragraph. The use of total lift divided by the magnet volume of a magnet arrangement provides one means of comparing the lift efficiency of different magnet arrangements. However, as noted above, the speed of the magnet relative to the substrate, which is a function of radius and RPM, effects lift and hence may be important to consider when comparing magnet configurations.

In FIGS. 2 and 3, a portion of the magnet poles in the magnet polarity pattern are aligned such that the poles are parallel to an axis of rotation of the STARM (The poles labeled with "x" or "o" in the Figures). When the bottom of a STARM is parallel to a surface which supports the induced eddy currents, the portion of the magnet poles and the axis of rotation are approximately perpendicular to the surface. In an alternate embodiment, as described in more detail with respect to FIGS. 24 and 25, the portion of the magnet poles in FIGS. 2 and 3 which are substantially parallel to the rotation axis can be rotated ninety degrees inwards or outwards such the magnet poles become perpendicular to the axis of rotation.

In this configuration, to interact with a surface, a STARM can be rotated on its side, like a tire riding on a road, where the axis of rotation is approximately parallel to the surface. In particular embodiments, a mechanism, such as an actuator, can be provided which can dynamically rotates one or more of the magnet poles (again, "x" and "o" labeled magnets) during operation. For example, the magnet poles shown in FIGS. 2 and 3 may be rotatable such that they can be moved from an orientation where they are perpendicular to the surface as shown in FIGS. 2 and 3 to an orientation where they are parallel to the surface and back again. When the magnets are turned in this manner, the amount of lift and drag which are generated can be reduced. In additional embodiments, fixed magnet configurations can be utilized where the magnet poles shown in FIGS. 2 and 3 are rotated by some angle between zero and ninety degrees relative to their orientation in the FIGS. 2 and 3.

FIG. 4A includes a plot 100 of lift 106 and drag 108 curves associated with an arrangement of rotating magnets in accordance with the described embodiments. The curves are force 102 versus rotational velocity 104. The curves can be determined via experimental measurements and/or simulations. It is noted the magnetic lift and drag is separate from any aerodynamic lift and drag which may be associated with the rotation of magnet arrangement associated with hover engine.

Although not shown, an amount of torque can be determined and plotted. As shown in FIG. 2, an array of magnets can be radially symmetric. In some instances, such as when a radially symmetric array is parallel to the conductive substrate, the net drag force may be zero. Nevertheless, a torque which opposes the rotation of the array is generated. The rotational input from a motor can be used to overcome the torque.

As shown in FIG. 4A, the magnetic drag increases as velocity increases, reaches a peak and then starts to decrease with velocity. Whereas, the magnetic lift increases with velocity. The velocity can be the velocity of the magnets relative to the surface which induces the eddy. When the magnets are rotating, this velocity is product of a distance from the axis of rotation times the angular velocity. The velocity can vary across a face of a magnet as distance from the axis of rotation varies across the face of the magnet.

In various simulations of a magnet configuration shown in FIG. 3, the most drag was observed to occur between 250 and 350 RPM. However, the amount of drag including its peak can depends on such variables as the size and the shape of the magnets, a distance of the magnets from the substrate in which the eddy currents are induced, a speed of the magnets relative to the substrate which changes as a function of radius and a thickness of the substrate and a strength of the magnets. Also, for an arrangement of a plurality of magnets, the arrangement of their poles and spacing relative to one another can affect both the lift and drag, which is generated. Thus, the value range is provided for the purposes of illustration only.

Figure 4B:
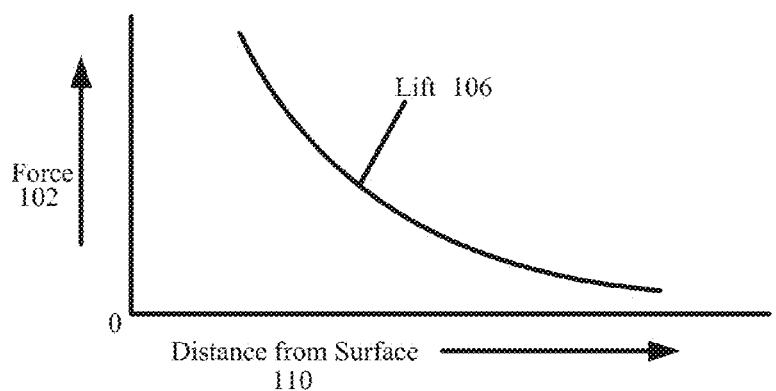
FIG. 4B is a plot of lift associated with an arrangement of rotating magnets as a function of distance from a conductive substrate in accordance with the described embodiments.

FIG. 4B is a plot of force 102 associated with an arrangement of rotating magnets as a function of distance 110 from a conductive substrate. In this example, a configuration of magnets similar to shown in FIG. 3 was simulated. The plot is based upon a number of simulations at a constant RPM. The lift appears to follow an exponential decay curve as the distance from the surface 110 increases.

Figure 4C:
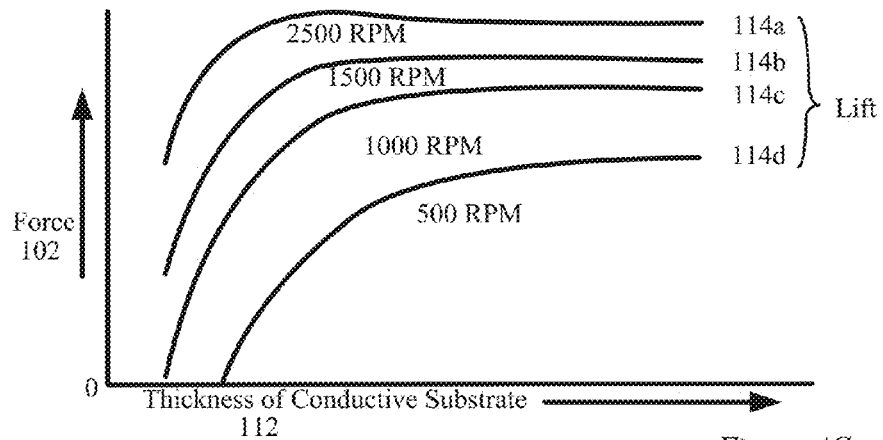
FIG. 4C is a plot of lift curves associated with an arrangement of rotating magnets as a function a thickness of a conductive substrate and RPM in accordance with the described embodiments.

FIG. 4C is a plot of lift curves associated with an arrangement of rotating magnets as a function a thickness of a conductive substrate and RPM. In this example, a configuration similar to what is shown in FIG. 3 was used. The conductive substrate is copper and thickness of the copper is varied between 0.05 and 0.5 inches in the simulation.

The simulations predicted that the amount of generated lift begins to decrease after a certain threshold thickness of copper is reached and is relatively constant above the threshold. The location of the threshold varies as a function of RPM. It may also vary according to the magnet configuration. In one simulation, negative lift was predicted, i.e., an attractive force was generated when the thickness was thin enough.

Figure 5A:
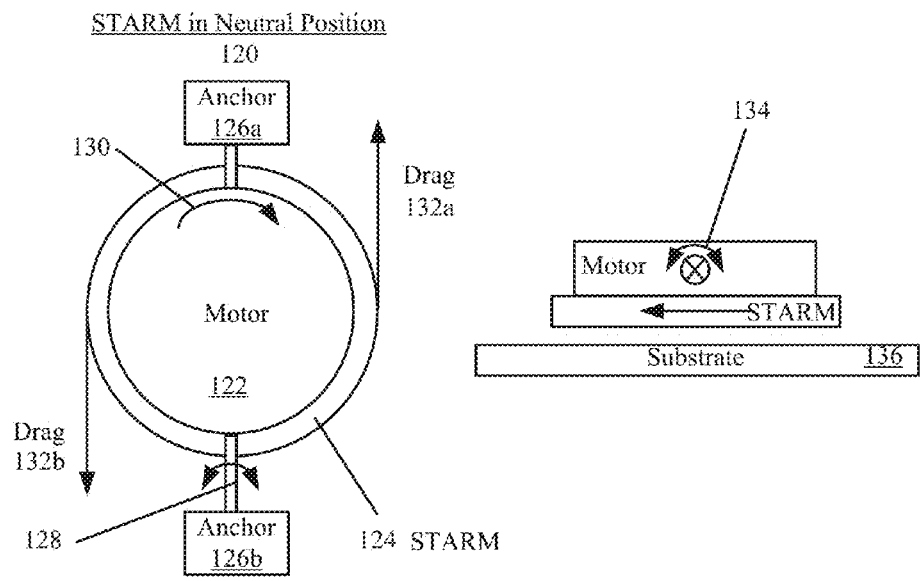
FIGS. 5A and 5B are block diagrams illustrating hovering and propulsive effects from rotating arrangements of magnets in accordance with the described embodiments.
Figure 5B:
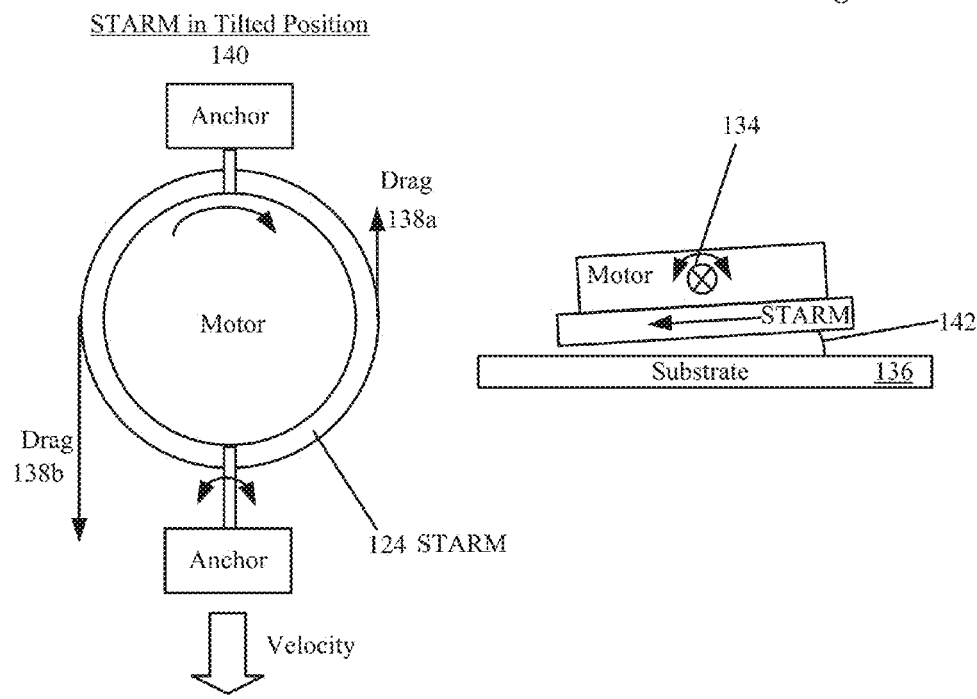

FIGS. 5A and 5B are block diagrams illustrating hovering and propulsive effects from rotating arrangements of magnets. In FIG. 5A, a motor 122 is coupled to a STARM 124. The rotatable components with magnets can be referred as a STARM (STator and ARMature). The motor 122 and STARM can be used as part of a hover engine.

The STARM 124 is coupled to the motor 122 and the motor 122 is coupled to a rotatable member 128. The rotatable member 128 is coupled to anchors 126a and 126b. The combination of the rotatable member 128 and the anchors 126a and 126b can be configured to constrain a range of rotation of the rotatable member. For example, the rotatable member 128 may be allowed to rotate through some angle range 134 around its axis.

The rotatable member 128 can be configured to receive and input torque from some mechanism. For example, in one embodiment, a mechanical linkage can be provided which allows a user to supply a force. The force can be converted into torque which causes the rotatable member 128 and hence the motor 122 and the STARM 124 to rotate.

In another embodiment, an actuator can be used to supply the torque to rotate rotatable member 128. An actuation of the actuator can cause the motor 122 and STARM 124 to tilt relative to the substrate 136. The actuator can include a servo motor which receives control commands from a controller. In one embodiment, the actuator can include its own controller which receives control commands from a separate processor, which is part of the control system.

In yet another embodiment, a hover engine can be configured to receive an input force from a user and can include an actuator. The actuator can be used to change a position of the STARM, such as returning it to a designated position after a user has tilted it. In another operation mode, the actuator can be used to provide automatic control around some tilt position initiated by user via an input force.

It yet another embodiment, the actuator can be used to provide automatic controls which may be used to correct a control input from a user. For example, if the control system detects that the board is about to slide out from underneath the user after a user provides a control input, the control system can control one or more STARMs to prevent this event from happening. The hoverboard can include one or more on-board sensors used to make these corrections.

For example, sensors, such as accelerometers, which measure translational and rotational accelerations, can be used to determine an orientation of the hoverboard and/or a position of a user relative to the hoverboard, which is used to generate an orientation correction in response to the user control input. In one embodiment, a first set of sensors, such as accelerometers, can be worn by a user, such as at their waist and a second set of sensors, such as accelerometers, can be located on the hoverboard. A processor, such as one onboard the hoverboard can be configured to receive the sensor data. The sensor data can be used to determine an orientation of the hoverboard relative to the person and possibly to make adjustments to a hover engine.

The hoverboard may also include one or more weight sensors for determining where a user is standing on the hoverboard. The weight distribution associated with the hoverboard and rider can affect the response of the hoverboard in response a command to change an orientation of the hoverboard via some mechanism, such as a tiltable hover engine. For example, the weight distribution associated with where a person is standing effects the magnitude of rotational moments. Thus, knowledge of the weight distribution may be used to more finely tune the commands used to control the orientation of the STARM, such as selecting which STARM to actuate and an amount to actuate it.

In one embodiment, a user riding the hoverboard can control actuation of the actuator via some action, such as a body movement or interaction with a control device, such as a foot pedal or control stick. The body movement or interaction with the control device can be translated by an on-board processor into one or more commands which are sent to the controller associated with the actuator. In response, the actuator can rotate the rotatable member by some amount.

As an example, the body movement can be characterized via a sensor in a device worn or held by the person. The data received from the sensor can be processed locally in the device worn or held by the person and/or via an onboard processor associated with the hoverboard. The processed data can be used to generate control commands which are sent to one or more actuators, which can tilt a STARM, or some other mechanism for generating a propulsive force.

In additional embodiments, a rider doesn't necessarily have to stand on the hoverboard. For example, a rider can sit on the board, lie on their back on the board or lie on their stomach on the board. Control mechanisms can be provided which enable a rider to control the board in these positions. In addition, structure can be provided which help support a rider in one of these positions. For example, a seat can be coupled to the hoverboard.

When the STARM 124 and motor 122 are rotating, a rotation of the rotatable member 128 changes the angular momentum of the STARM and the motor. It can also change the magnetic forces acting on the STARM 124 as the magnetic forces vary with the distance of the magnets in the STARM 124 from the substrate 136. Therefore, the amount of torque needed to rotate the member 128 can depend on the moment of inertia associated with the STARM 124 and motor 122, how fast the STARM 124 and motor 122 are spinning and the height of the STARM 124 above the substrate 136. The height of the STARM above the substrate can depend on its velocity, which affects how much lift is generated as well as a payload weight, i.e., the weight of a hoverboard rider and how the riders' weight is distributed on the hoverboard. The height of the STARM above the substrate can vary for different portions of the STARM and from STARM to STARM when a hoverboard includes multiple STARMs.

In the example of FIG. 5A, the STARM 124 is approximately parallel to the substrate 136. The magnetic drag, such as 132a and 132b, opposes the rotation of the STARM 124. The motor 122 is configured to rotate in the clockwise direction 130. Thus, the drag torque is in the counter clockwise direction. Power is supplied to the motor 122 to overcome the drag torque.

When the STARM is parallel to the substrate 136, the magnetic drag is balanced on all sides of the STARM 124. Thus, there is no net translational force resulting from the magnetic drag. As is described with respect to FIG. 5B, a net translational force is generated when the STARM 124 is tilted relative to the substrate.

In FIG. 5B, the STARM 124 is in a titled position 140. Thus, one side of the side of STARM 124 is closer to the substrate 136 and one side of the STARM 124 is farther away from the substrate 136. The magnetic interaction between the magnets in the STARM 124 and substrate decreases as a distance between the magnets in the STARM and substrate 136 increases. Thus, in tilted position 140, the drag force 138b is increased on one side of the STARM 124 and the drag force 138a is reduced on the opposite side of the STARM 124 as shown in FIG. 5B. The drag force imbalance creates traction, which causes a translational force to be generated approximately in the direction of the axis of rotation of the rotational member 128.

When the STARM 124 is initially tilted, the translational force can result in an acceleration of the STARM 124 in the indicated direction and hence change in velocity in the indicated direction. In particular embodiments, with one or more STARMs configured to generate translational forces, a hoverboard can be configured to climb. In another embodiment, the hoverboard may be configured to maintain its position on a slope while hovering such that the gravitational forces acting on the rider and the board are balanced by the translational forces generated by the hoverboard and its associated hover engines.

A configuration and operational mode where a position of the hoverboard is maintained on a sloped substrate may be used as part of a virtual reality system where a rider wears a virtual reality headset. Via the headset, the user may only see images generated by the headset or may see images generated by the headset in conjunction with the local surrounding visible to the user. A virtual reality headset may be used to generate images of a user moving through some terrain, likes a snowy slope, while the hoverboard moves side to side and forward and back on the sloped substrate. The sloped substrate may provide the user with the feeling of moving on a tilted slope while the virtual reality images may provide the visual imagery associated with movement. Fans may be used to add an additional sensation of movement (e.g., the feeling of wind on a person's skin).

The hoverboard can have sufficient propulsive ability to allow it to hold its position on the slope against the force of gravity. For example, the hoverboard can be moved side to side while it maintains its position on the slope. Further, the hoverboard may be able to move downwards on the slope and then climb upwards on the slope against gravity. In some instance, the climbing can be done while the board's orientation remains relatively unchanged, i.e., the board doesn't have to be turned around to climb. This maneuver can be accomplished by changing an orientation of the hover engines relative to the substrate which supports the induced eddy currents.

Returning to FIGS. 5A and 5B the amount of tilt in a particular direction can affect the amount of force imbalance and hence the magnitude of the acceleration. Because the magnetic drag is function of the distance of the magnets from the substrate, the magnetic drag increases on the side closer to substrate and decreases on the side father away from the substrate. As the magnetic forces vary non-linearly with the distance of the magnets from the surface, the amount of translational forces which are generated may vary non-linearly with the tilt position of the STARM.

After a STARM 124 (or both the STARM 124 and motor 122) has been rotated via member 128 in a counter clockwise direction and the STARM has started translating in a first direction, an input torque can be provided which tilts the STARM in a clockwise direction to reduce the amount of translational force which is generated by the STARM. When the STARM is tilted past the horizontal in the clockwise direction, the STARM may generate a translational force which is in an opposite direction of the first direction. The translational force opposing the direction of motion can slow the STARM and bring it to rest. If desired, the translational force can be applied such that the hoverboard stops and then the STARM can begin to translate in an opposite direction.

Hoverboard and Hover Engine Configurations

With respect to FIGS. 6-25, a number of configurations of a hoverboard with hover engines are described. In particular, hover engine configurations and their integration into a hoverboard system are described. In addition, a number of different mechanisms, which enable a force to be transferred to a hover engine to cause an orientation of the hover engine to change, are described.

FIG. 6 is a bottom view of a hoverboard 200 with hover engines with mechanisms which provide for tilting along a specified axis. The hover engines are coupled to a support structure 202. In one embodiment, the support structure 200 may also be used to provide a rider platform. The hoverboard 200 includes four hover engines, such as 206. The hover engines each include a motor (not shown) and a STARM 204.

A location 212 of a center of mass of the hoverboard 200 is shown. This location can denote the location when the hoverboard is unloaded, i.e., it doesn't include a rider. When a rider is riding the hoverboard 212, the individual can change their position on the hoverboard to shift the location of the center of mass and hence change various rotational moments associated with the hoverboard 200. Thus, the location 212 is shown for illustrative purpose only and is not meant to be limiting.

An axis 208 is shown drawn through the center of mass 212. A rider can shift their weight such that a moment is generated and the hoverboard 200 tilts around an axis, such as 208. The rider can change shift their weight in many different ways which can result in a moments in different directions being generated and a corresponding tilt of the board along different axes. Thus, the example of axis 208 is shown for illustrative purposes only.

In particular embodiments, a rider may be able to freely move their position over a top surface of the hoverboard 200. In another embodiment, the hover board can include foot restraints of some type, such as a strap which a rider can insert their feet through. When a rider's feet are constrained, the amount of movement of the center of mass and the possible moments which are generated may also be constrained.

A change in position can cause the hoverboard to tilt. The change can include a dynamic component where the hoverboard shifts between different orientations and then a relatively steady state orientation where the tilt position of the hoverboard is steady. Thus, the dynamic and steady state tilt position of the hoverboard can change the height positions of the hover engines relative to ground. The change in height positions can cause the hover engines to generate a net translation force which allows the hoverboard to be propelled in a particular direction.

While hovering, the lateral forces constraining the hoverboard can be very small. Thus, when a person shifts their weight in a particular direction, the hoverboard 200 will move in response and can slide out from underneath the person. Thus, the hoverboard can differ from a device, such as a skateboard or ice skates, where the lateral movement is constrained, due to the friction generated between the wheels or blades, with the ground or ice.

In a particular embodiment, to provide an ability of a rider to control forces on the hoverboard, the hoverboard can include one or more hover engines each with a tilt mechanism which allows the hover engines to be tilted in response to an input force generated by the rider. As described above, the input force can be used as part of an analog or digital control system. Additional details of different tilt mechanisms are described with respect to FIG. 9-21. Alternate embodiments, where the orientation of the hover engines on the hoverboard are fixed, are described with respect to FIGS. 22A-25.

In the example of FIG. 6, tilt axes, such as 216, are shown through each STARM, such as 204. A mechanism is provided which tilts each STARM about at least one axis. As described with respect to FIG. 14, a mechanism can be provided which allows a tilt of the STARM about multiple axes. Thus, the example in FIG. 6 is provided for illustrative purposes only.

The tilt axes, such as 216, are used to describe a tilt of the hover engine relative to the hoverboard 200, such as relative to a plane parallel to a top surface of the hoverboard. As described above, the entire hoverboard can also be tilted relative to a substrate. For example, the rider, by shifting their weight, can tilt the hoverboard 200 about axis 210. Thus, the tilt of the hover engine, relative to the substrate and the associated height of the magnets in the hover engine above the substrate at particular time, depends on both the tilt of the hover engine relative to the hoverboard and the tilt of the hoverboard relative to the substrate.

In FIG. 6, the tilt axes, 216, are configured to provide lateral spin control. When a rider shifts their weight to one of the corners, the hoverboard 200 can tend to keep moving in the direction where the rider shifted their weight which can cause the board to slide out from underneath the rider. The tilt mechanism can be configured to generate a force, such as 218, which negates this effect. Thus, the rider may continue to more easily ride board without falling off.

In the example of FIG. 6, the forces, such as 218, which result from a tilt of a hover engine, are shown approximately perpendicular to a side of the hoverboard 200 and parallel to the tilt axes, such as 216. Further, the tilt axes are all parallel to one another. In various embodiments, the tilt axes don't have to be orientated in this manner, such as perpendicular to a side of the hoverboard 202 or all parallel to one another and this example is provided for illustrative purposes only. Thus, the tilt axis can be position at various angles relative to one another and the hoverboard 200.

In addition, not all of the hover engines may include tilt mechanisms which allow the hover engine to be tilted relative to the hoverboard. Thus, the tilt of some hover engines may be rider (or system) controllable while other hover engines may be configured in a fixed position and may not be tilted. For example, the hoverboard may include a large hover engine in the center which is configured for primarily generating lift and then may be surround by a plurality of smaller hover engines which are used to generate control forces. The larger hover engine can be installed in a fixed position such that its orientation relative to the hoverboard doesn't change whereas the smaller hover engines may be coupled to a tilt mechanism which allows them to tilt relative to the hoverboard. Both the larger and the smaller hover engines may be tilted relative to a substrate in response to dynamic changes in the center of mass of the hoverboard and rider system. An advantage of this approach is that the smaller hover engines may have a smaller moment of inertia and hence may be more easily tilted about an axis by a person or a by an actuator. In the case of the actuators, a smaller moment of inertia may allow for less powerful actuators to be employed.

In yet another embodiment, the hoverboard 200 can include an automatic control system. The automatic control system can be configured to detect movement in a particular direction. An acceleration, a velocity or a change in a position may be detected using an on-board sensor package. In response, a logic device, such as an on-board processor, can be configured to actuate one or more tilt mechanisms as a function of time to generate some complementary movement. For example, a shift in weight and a subsequent movement of the board can be detected. In response, the automatic control system can actuate one or more of the tilt mechanisms as a function of time to keep the board from sliding out from underneath the person.

In various embodiments, a tiltable hover engine may be moved only in response to rider inputs, moved only in response to commands from a control system or combinations thereof. For example, an actuator coupled to a hover engine can be configured to actuate in response to a control input generated by a rider at some times and at other times in response to control input generated by a control system. The control system may receive input from a sensor package to generate control signals which augment the control inputs from the rider. Further, an orientation of one or more first tiltable hover engines on a hoverboard may be only controlled by a rider, such as via a manual actuation from the rider, whereas an orientation of one or more second tiltable hover engines, tilted via actuators, on the hoverboard may only be controlled by a control system implemented on a logic device on the hoverboard. In another embodiment, a single hover engine may be controlled in response to user inputs at one time and then at another time be controlled based upon commands generated by the control system, which are generated independently from the user. For example, the control system may be configured to shut down a hoverboard and bring it to rest independently of any direct control inputs provided by a user.

The tilt mechanisms can be coupled to the hover engine, such that the amount of force and the direction of the force can be varied over a range. For example, the tilt mechanism can be configured to cause a force 218 which is only toward the vehicle in a range of zero to some maximum value. In another embodiment, the tilt mechanism can be configured to generate a force which can be directed toward the vehicle or outward from the vehicle where the maximum value in each direction may be substantially equal or the maximum value in one direction may be greater than the other direction. In yet another embodiment, which is described with respect to FIG. 7 as follows, the tilt mechanism can be configured to generate a force which is between a minimum value greater than zero and a maximum value.

FIG. 7 is a side view of a hover engine 230 coupled to a tilt mechanism in a tilt position. The hover engine includes a motor 122 and a STARM 124 which are positioned over the substrate 136. In one embodiment, the mechanism can include a minimum tilt off set angle 234. The minimum tilt off set angle 234 in this example is between the horizontal and line 232. The tilt range angle 236 is the angle amount through which the hover engine may rotate starting at the minimum tilt off set angle 234. The tilt mechanism can include one or more structures which constrain the motion of the tilt mechanism to the tilt angle range.

When the minimum tilt off set angle 234 is zero and the STARM 124 is parallel to the substrate 136, the STARM 124 may not generate a net translation force. As described above, during operation, a hoverboard to which a STARM is coupled can be tilted. Therefore, the angle of the STARM relative to the substrate can depend on the orientation of the STARM relative to some reference system associated with the hoverboard and the orientation of the hoverboard relative to the substrate where both orientations can change as a function of time. Thus, in some instances, a translation force can be generated even when the minimum tilt off-set is zero. When the minimum tilt off set angle is greater than zero, the STARM may generate a net translational force at its minimum position in a particular direction. When the minimum tilt off set angle is less than zero, then during the tilt angle range the magnitude of the force may be go to zero and the direction of the force which is generated can also change.

In some embodiments, the net minimum force generated by one hover engine can be balanced in some manner via translational forces associated with other hover engines. For example, as shown in FIG. 6, two hover engines can be tilted to generate forces in opposite directions to cancel one another. Thus, although the net force for a single hover engine may be greater than zero at its minimum tilt off set angle position, it can be balanced by forces generated from another STARM such that the net force acting on the hoverboard is zero.

The forces which are generated from a tilted STARM can vary non-linearly with angle of the hover engine relative to the substrate. Thus, the change in force which is generated as a function of a change in angle can vary non-linearly. By utilizing, a minimum tilt angle offset, the hover engine can be configured to output more or less force in response to a change in a tilt angle over a selected tilt angle range. In this manner, the control characteristics of the hoverboard can be adjusted.

In one embodiment, the tilt mechanisms can include an adjustable tilt off set mechanism that allows the minimum tilt off set angle to be manually set. For example, a rotatable member with a protuberance can be provided where the protuberance is configured to impinge on a screw at one end of its range of rotation. As the screw is unscrewed, the range of rotation of the rotatable member can be decreased and the minimum tilt off set angle can be increased and vice versa. Using the adjustable tilt off set mechanism, a user or operator may be able to manually adjust the handling characteristics of the hoverboard.

In other embodiments, the motor 122 and STARM 124 can be tilted up to ninety degrees, such that side 152 is parallel to a top of the substrate 136. The side 152 and a portion of side 150 can be covered to allow contact the top of the substrate in this position. For example, a rubber tire can be used which covers side 152 and a portion of side 150. In yet another embodiment, the STARM 124 can have additional magnets with poles which point outwards through side 152. In yet another embodiment, a portion of the magnets on STARM 124 can be rotatable to allow the magnet poles to rotate from a position where they intersect side 150 to a position where they intersect side 152. For example, the magnet poles can range from a position where they are perpendicular to side 150 to a position where they are perpendicular to side 152.

FIG. 8A is a perspective view of a STARM 400. The STARM 400 is 10 inches in diameter. In various embodiments, the STARMs used on a hoverboard can be between four and fourteen inches in diameter. The STARM includes a raised outer ring 405. A distance from a bottom of the STARM 400 to a top of the outer ring is about 1.13 inches. This height allows one inch cubed magnets to be accommodated. In one embodiment, twenty one inch cube magnets are arranged within the outer ring. In particular embodiments, the volume of magnets on the hoverboard, which can be distributed among one or more STARMS, can be between thirty and eighty cubic inches.

In one embodiment, the STARM 400 including the outer ring 405 can be formed from a number of layers, 402, 408, 410, 412, 404 and 414, from top to bottom, respectively. Layers 402 and 414 form a cover over the top and bottom portions of the magnets in the outer ring. In one embodiment, layers 402 and 408 are about 0.065 of an inch thick. In alternate embodiment, one or both of layers 402 and 408 can be eliminated. In one embodiment, the top and bottom layers can be formed from a material such as aluminum. In another embodiment, the top layer 402 can be formed from a material with magnetic properties, such as mu-metal, iron or nickel.

Layers 408, 410, 412, 404 each include twenty apertures to accommodate twenty magnets. More or less magnets and hence more or less apertures can be utilized and this example is provided for illustrative purposes only. The total thickness of the layers is one inch and each layer is 0.25 inch thick. In one embodiment, two layers are formed from polycarbonate plastic and two layers are formed from aluminum. The polycarbonate plastic can reduce weight. In various embodiments, the thickness of each layer, the material used for each layer and the number of layers can be varied. For example, different metals or types of plastics can be used. As another example, a single material can be used for each of the layers.

When the layers are aligned, the one inch cube magnets can be inserted through the layers. For different shaped or different size magnets, such as rectangular shaped magnets, trapezoidal shaped magnets or 1.5 cubic inch magnets, a different aperture shape or size can be used. In one embodiment, an adhesive can be used to secure the magnets in place, such as super glue. When secured, the bottoms of the magnets are approximately flush with the bottom of layer 404. This feature can maximize the height between the bottom of the magnets and the substrate when a vehicle using the STARM design 400 is hovering.

One or more layers can include apertures, such as 416, that allow fasteners to be inserted. The fasteners can secure the layers together. In another embodiment, an adhesive can be used to secure one or more of the layers to one another. In alternate embodiment, the layers 404, 408, 410 and 412 can be formed as a single piece.

FIG. 8B is a side view of STARM 420 with an embedded motor 422. The cross sections of two magnets, 415, are shown within the outer ring 405. The top of the magnets is flush with the outer top of layer 408 and the bottom of the magnets is flush with the bottom of layer 404. In various embodiments, the STARM 420 can be configured to receive magnets between 0.5 and 2.5 inches of height.

In one embodiment, the top of the magnets may extend above the top of the 408. Thus, the outer ring 405 may only extend partially up the sides of each magnet. This feature may allow the magnets to be secured in place while reducing weight.

The inner radius 424 of the outer ring 405 is greater than a radius of the motor 422. Thus, the motor can be inserted within the outer ring and secured to layer 404 such that the STARM 420 can be rotated when the motor is operated. Thus, the outer ring extends along the side 430 of the motor. An advantage of mounting the motor in this manner is that the overall height profile of the hover engine may be reduced as compared to mounting the motor 422 at a height above the top of the outer ring.

In various embodiments, the height 428 height of the outer ring may be less than the height of the motor 426, such that the outer ring extends partially up the side 430 of the motor 422. In another embodiment, the height 428 of the outer ring 405 and the height of the motor can be approximately equal. In yet another embodiment, the height 428 of the outer ring can be greater than the height of the motor.

It may be desirable to increase the height 428 to accommodate taller magnets. Taller magnets may be used to increase the amount of magnetic lift which is generated when the magnets, such as 415 are at a greater distance from a substrate. The volume of a magnet including its height can affect the strength of the magnetic field at a particular distance which extends from a magnet.

The motor, such as 422, used to rotate a STARM can be electric or combustion based. In general, any type of motor which outputs a suitable amount of torque can be used. An electric motor requires a power source, such as battery or a fuel cell, to supply electricity. A combustion motor requires a fuel which is combusted to operate the motor. Battery types include but are not limited to batteries with a lithium or zinc anode, such as lithium ion, lithium polymer or a zinc-air system.

An electric motor can be configured to output torque about a rotational axis. The electric motor can include a configuration of wire windings and a configuration of permanent magnets. Current is provided through the windings to generate a magnetic field which varies as a function of time. The magnetic field from the windings interacts with magnetic field from the permanent magnets to generate a rotational torque. AC or DC motors can be utilized, such as an induction motor or a DC brushless motor.

In various embodiments, the windings can be configured to rotate while the magnets remain stationary or the magnets can be configured to rotate while the windings remain stationary. An interface, such as a shaft, can be provided which couples the rotating portion of the motor to the STARM 400. In FIG. 8A, the STARM 400 is configured to interface with the motor at 406.

The non-rotating portion of the motor 422 can be integrated into a motor housing which surrounds the magnets and the windings. The motor housing can include an interface which enables it to be attached to one more structures associated with the hoverboard. In another embodiment, non-rotating portion of the motor can include an interface which allows it to be directly attached to one or more structures associated with the hoverboard.

In a particular embodiment, the core of the motor 422 can be stationary where both the magnets associated with the motor and the magnets associated with the STARM rotate around the stationary core. One non-rotating support structure can extend from the core which allows the motor and STARM to be coupled to the hoverboard. A second non-rotating support structure can extend from the core which provides support to a portion of a shroud which is interposed between a bottom of STARM and the substrate which supports the induced eddy currents (see FIG. 8C). As is described in more detail with respect to FIGS. 17A-17E, various shroud configurations may be used to surround a STARM.

The arrangement of magnets in the motor 422 can include poles which are substantially perpendicular to the axis of rotation of the motor (often referred to as a concentric electric motor) or can include poles which are substantially parallel to the axis of rotation of the motor (often referred to as an axial electric motor). In one embodiment, a winding configuration, such as the winding configuration associated with an axial motor, can be used to induce eddy currents in a substrate. In these embodiments, there are no rotating parts and the STARM and the magnets associated with an electric motor are eliminated. As part of a hover engine, the windings can be tilted relative to a hoverboard to generate control forces in a manner previously described above with respect to FIGS. 5A and 5B.

In yet another embodiment, the magnets associated with the motor 422 can be removed and a motor winding can be designed which interacts directly with the magnets in the STARM. For example, a winding can be placed above magnets 415 to interact with the magnetic flux above the magnets or a winding can be placed around the outside of magnets 415 or around the inside of magnets 415. A current applied to the winding to cause the STARM to rotate. As described above, rotation of the STARM can cause eddy currents to be induced in a portion of a substrate.

As an example, the motor 422 can include an outer ring configured to rotate. The STARM 400 can mounted be to the outer ring of the motor 422 instead of to a shaft extending from the center of the motor. This type of motor design can be referred to as an outboard design. This feature may allow the portion of layers 404 and 412 within the inner radius 424 of the outer ring 405 to be removed such that the bottom of the motor is closer to the bottom of the outer ring 405. One advantage of this approach is that the overall height of the STARM 420 and motor 422 may be reduced.

In a particular embodiment, the outer ring 430 of the motor and the outer ring 405 of the STARM may be formed as an integrated unit. For example, the outer ring of the motor 422 can have a layer extending outwards from the side 430. The layer extending from the side 430 can include a number of apertures through which magnets can be inserted. Optionally, one or more layers with apertures, such as 408, 410 and 412, can be placed over the magnets.

In general, in a hover engine, the support structures associated with the STARM, the stator of the motor, the shroud and housing can be integrated with one another. For example, an enclosure for the motor and STARM can include an integrated shroud. In another example, the structure forming the rotor for the motor can be integrated with the structure for the STARM. In another example, all or a portion of the structure forming the stator of the motor can be integrated with a housing and/or shroud associated with the hover engine.

Figure 8C:
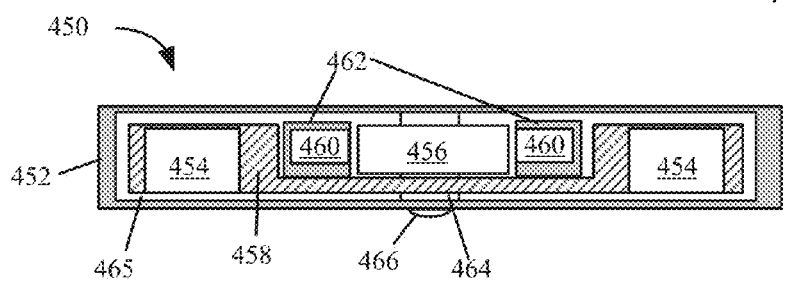
FIG. 8C is a side view of a STARM integrated with a motor in accordance with the described embodiments.

FIG. 8C is a side view of a hover engine 450 having a STARM 465 integrated with a motor in accordance. The hover engine 450 includes a stationary core 456 with windings configured to interact with magnets 460 to rotate the magnets. The core is attached to the support structure 464. The support structure 464 can provide a first interface to attach the hover engine to a hover board. In addition, the support structure 464 can be coupled to a housing 452 which surrounds both motor and the STARM 465. The support structure 464 may be used to help maintain a gap between the bottom of the STARM 465 and the housing 452.

In one embodiment, a small protuberance 466 may be provided at the end of support structure 464. The small protuberance 466 can be formed from a metal or a material with a low friction coating, such as a Teflon coated material. The small protuberance can provide a small stand-off distance when the hover engine is near the ground, such as during take-off and landing. It can help prevent the STARM 465 from impinging the ground. In particular embodiments, the protuberance 466 can be coupled to a portion of the hover engine which rotates or a portion which remains static during operation.

The STARM 465 includes a structure 458 surrounds the magnets 454. As described above, the structure 462 surrounding magnets 460 and the structure 458 surrounding magnets 454 can be formed as a single piece. The magnets 454 and 460 may be shaped differently and have different sizes relative to one another.

In various embodiments, bearings (not shown) can be provided between the support structure 464 and the structure 458 to allow the STARM 465 to rotate about the stationary core. In lieu of or in addition to bearings between the STARM structure 458 and the support structure 464, bearings can be provided at one or more locations between the housing 452 and the structure 458. For example, bearings may be placed between the bottom of the STARM 465 and the housing 452 to help maintain the spacing between the housing 452 and the STARM 465 on the bottom of the STARM. In another example, a bearing may be placed between the side of the STARM and the side of the housing 452 to maintain the spacing between the inner side of the housing 452 and the side of the STARM.

In one embodiment, the height of the hover engine can be less than three inches. In another embodiment, the height of the hover engine can be less than two inches. In yet another embodiment, the height of the hover engine can be less than one inch. Next details of a hoverboard including a plurality of hover engines are described.

Figure 9:
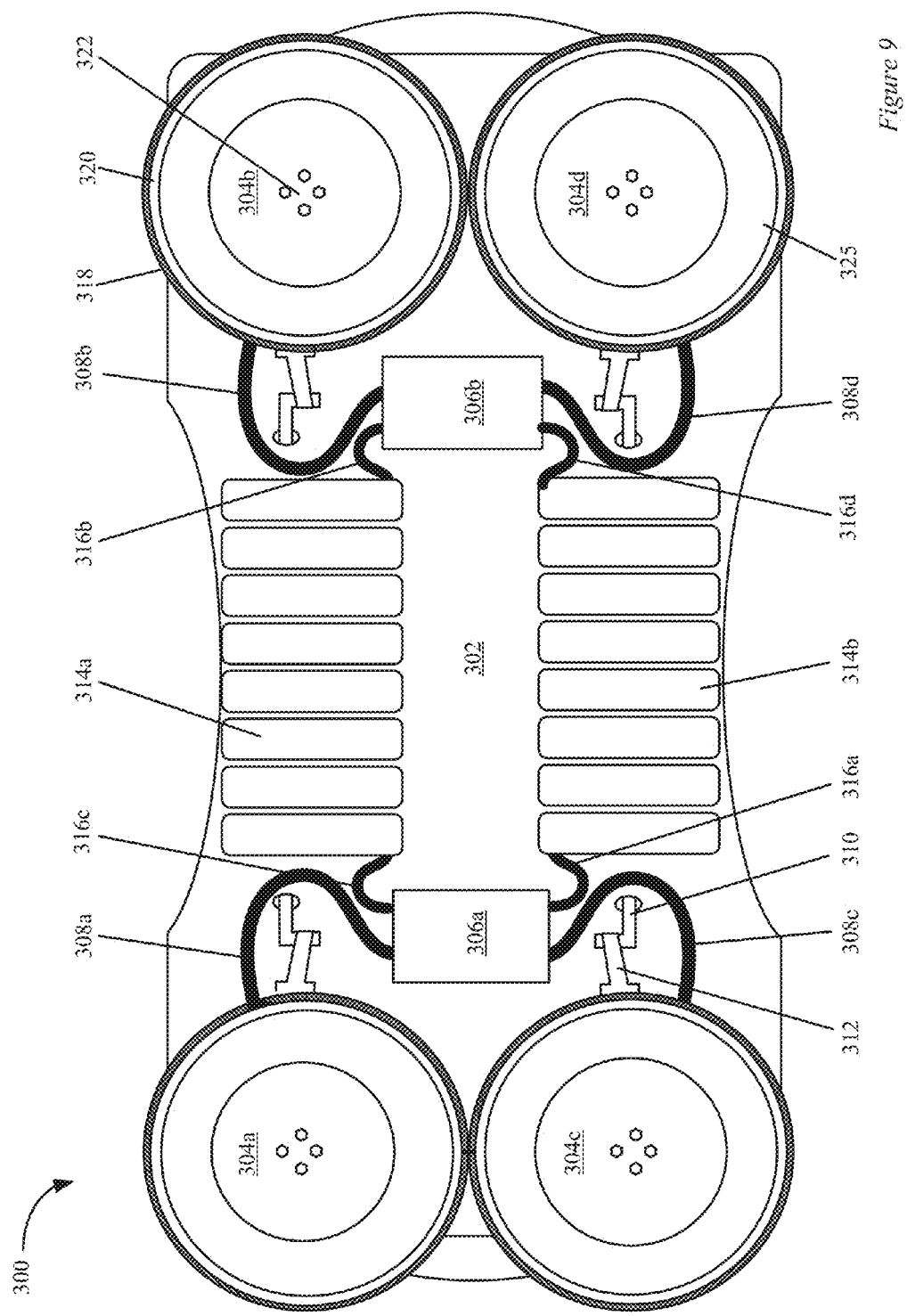
FIGS. 9, 10 and 11 are a bottom, top and side view of a battery powered hoverboard in accordance with the described embodiments.
Figure 10:
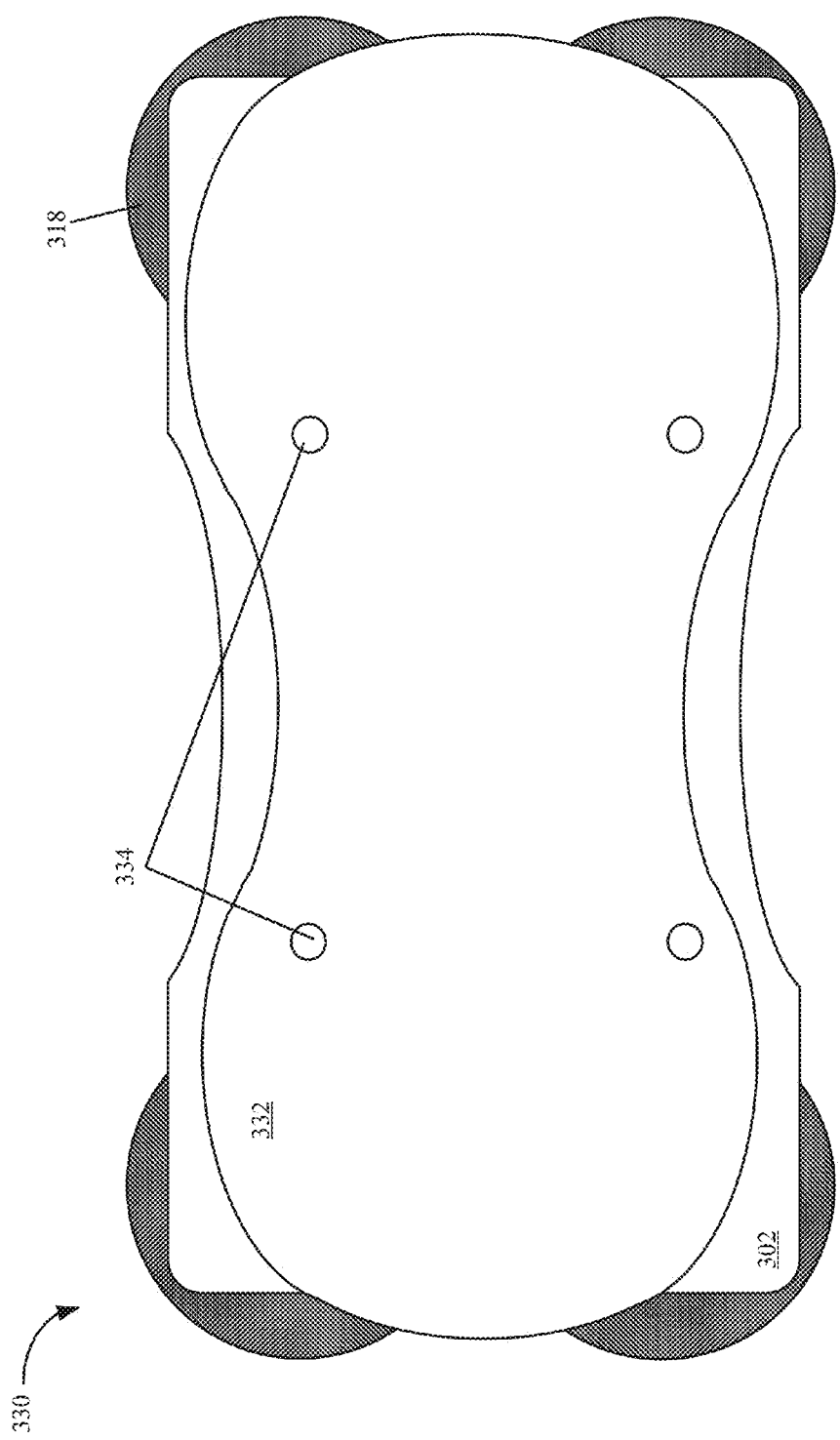
Figure 11:
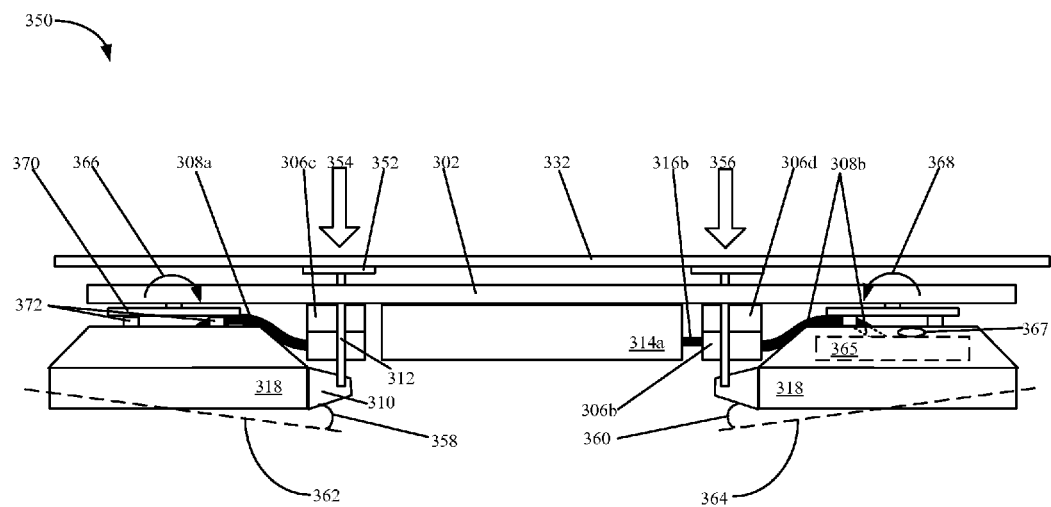

FIGS. 9, 10 and 11 are a bottom, top and side view of a battery powered hoverboard 300. In FIG. 10, the hoverboard 300 includes four hover engines, 304a, 304b, 304c and 304d. The hover engines are of equal size and identical to one other, i.e., similar motor, number of magnets, STARM diameter, etc. In alternate embodiments, additional or less hover engines can be provided where the size of the hover engines may vary from hover engine to hover engine.

The dimensions of the hoverboard 300 are about 37.5 inches long by 4.5 inches high by 18.5 inches wide. The weight of the hoverboard unloaded is about 93.5 pounds. The hoverboard can be configured to carry a rider weighing up to 392 pounds. In operation, the distance between the hoverboard 300 and the substrate which supports the induced eddy currents may vary depending on the weight of the rider.

Each hover engine includes a STARM, such as 325, with a motor (not shown) and engine shroud 318 with a gap between the shroud 318 and STARM 325 to allow for rotation. The STARM 325 is connected to the motor via connectors 322. The motor provides the input torque which rotates the STARM. In alternate embodiments, a single motor can be configured to drive more than one STARM, such as 325.

In one embodiment, the STARMs, such as 325 are 8.5 inches in diameter. The STARMs are configured to receive sixteen one inch cube magnets. Thus, the total volume of the magnets on the hoverboard is 64 cubic inches. In one embodiment, Neodymium N50 strength magnets are used. The magnets each weigh about 3.6 ounces (force). Therefore, the total magnet weight for one hover engine is about 3.6 pounds (force).

As described above, a total magnet weight and volume can vary from STARM to STARM mounted to hoverboard. For example, hover engines, 304b and 304d, may each have STARMs with twenty one inch cube magnets and hover engines, 304a and 304c, may each have STARMs with twelve one inch cube magnets. In this embodiment, the STARMs are mounted beneath the motor as compared to within a center of the STARM as shown in FIG. 8B.

In one embodiment, the motors can be a q150 DC brushless motor from Hacker Motor (Ergolding, Germany). The motor has a nominal voltage of 50 Volts and a no load current of 2 Amps. The weight is about 1995 grams. The speed is about 52.7/min. The RPM on eta max is about 2540. The torque on eta max is about 973.3 N-cm. The current on eta max is about 53.76 Amps. In one embodiment, the motor can be operated between about 1000 and 2300 RPMs. In different embodiments, motors can be operated at higher or lower RPMs, such up to 10,000 RPMs The hover engines each have a shroud, such as 318. The shroud 318 partially encloses the STARM, such that a bottom of the STARM is exposed. A tilt mechanism 312 is coupled to the shroud 318 of each hover engine. The tilt mechanism 312 is coupled to a pivot arm 310. The hover engines 304a, 304b, 304c and 304d are suspended beneath a support structure 302.

The pivot arms, such as 310, extend through an aperture in the support structure. The pivot arms can be configured to move and tilt the shroud in some manner. More complex mechanical linkages are possible and the pivot arm is provided for the purposes of illustration only and is not meant to be limiting. In general, a mechanical linkage configured to transfer a force can have one or more members and one or more pivot points.

The motors in each hover engine can be battery powered. In one embodiment, sixteen battery packs are used. The batteries are VENOM 50C 4S 5000MAH 14.8 Volt lithium polymer battery packs (Atomik RC, Rathdrum, Id.). Each battery weighs about 19.25 ounces. The dimensions of the batteries are 5.71 inches by 1.77 inches by 1.46 inches. The minimum voltage is 12 V and the maximum voltage is 16.8 V. Other types of batteries can be used and these are provided for the purposes of illustration and are not meant to be limiting.

The sixteen batteries are wired together in four groups of four batteries and each coupled to motor electronic speed controllers, such as 306a and 306b via connectors 316a and 316b to four adjacent battery packs. Connectors 316c and 316d each connect to four batteries and to a motor electronic speed controllers, 306c and 306d, which are stacked behind, 306a and 306b (see FIG. 11). The wire connections for the batteries are not shown. The batteries are wired in series in this example to provide up to about 60 V to the electronic speed controllers.

In an alternate embodiment, an AC power source may be used. For example, a device, such as the hoverboard can be coupled to AC power source which powers AC electric motors. In this embodiment, the batteries can be removed and replaced with a power converter which is suspended beneath the structure 302.

The motor electronic speed controllers, 306a, 306b, 306c and 306d are coupled to each of the four motors via wire bundles 308a, 308b, 308c and 308d. The electronic speed controllers are stacked on top of one another. Hence, electronic speed controllers 306c and 306d are not visible in FIG. 9 (instead see FIG. 11).

An electronic speed controller can be an electronic circuit which can vary an electric motor's speed, its direction and possibly also to act as a dynamic brake. Electronic speed controllers are often used for brushless motors to provide an electronically generated three-phase electric power low voltage source of energy for the motor. An example of brushless electronic speed controllers is a Jeti Spin Pro Opto brushless esc (Jeti USA, Palm Bay, Fla.).

Electronic speed controllers can be programmed to control a speed of the motor. Further, the speed controllers can be configured to detect and store a peak controller temperature, maximum current, minimum current, RPM and motor run time. The electronic speed controllers can be coupled to a wireless transmitter for sending telemetry data and receiving control commands from a wireless controller.

In one embodiment, each electronic speed controller can be coupled to a number of Lithium Polymer batteries, such as four to fourteen cells. In FIG. 9, four battery backs are shown coupled to each controller to provide up to sixty Volts. Electronic speed controllers are normally rated according to maximum current, for example, 25 amperes. Generally, the weight of the electronic speed controller increases as the maximum current capacity increases. Many modern electronic speed controllers can support nickel metal hydride, lithium ion polymer and lithium iron phosphate batteries with a range of input and cut-off voltages.

For brushless electric motors, the correct phase varies with the motor rotation, which can be taken into account by the electronic speed controller. Usually, back EMF from the motor is used to detect this rotation, but variations exist that use magnetic (Hall Effect) or optical detectors. Computer-programmable speed controls generally have user-specified options which allow setting low voltage cut-off limits, timing, acceleration, braking and direction of rotation. In some instances, the motor's direction can be reversed by switching any two of the three leads from the electronic speed controller to the motor.

In alternate embodiments, other types of electric motors can be used. For example, one or more brushed electric motors can be used. In brushed electric motors, brushes carry power to windings which rotate. DC motors can include shunt motors, separately excited motors, series motors, permanent magnet DC motors and compounded motors. AC motors can include induction motors and synchronous motors. Other electric motor types can include stepper motors, hysteresis motors, reluctance motors and universal motors. As described above, non-electric motors, such as a combustion motor can also be utilized.

FIG. 10 is a top view 330 of the hoverboard. The hover engines are suspended beneath the central support structure 302 as described above with respect to FIG. 9. The shrouds, such as 318, of the hover engines extend slightly beyond an edge of the support structure 302. The shrouds can be made strong enough to support a weight of a person without impinging any underlying parts, such as a rotating STARM.

A rider platform 332 is mounted above the support structure. The top of the rider platform 332 may substantially flat, i.e., a minimal amount of protuberances. The protuberances may be minimized to allow a rider to move around the rider platform without tripping. Although, as described below, the rider platform may be configured to bend and flex and hence may be curved. In one embodiment, the rider platform may include foot straps for securing a rider's feet in place. In various embodiments, the rider platform 332 and the support structure can be formed as a single integrated unit (e.g., see FIGS. 22A-22D).

Some examples of materials which may be used to form support structure 302, shroud 318 and rider platform 332 include but are not limited to wood, plywood, plastic, reinforced plastic, polymers, glass filled nylon, fiber glass, reinforced composites, metals (e.g., aluminum), metal alloys, metal composite materials (e.g., an aluminum composite material), a hemp composite, composites with a honeycomb core or other inner structure, composites with a balsa core, expanded metal, etc.

The pivot arms 310, which are attached to each of the hover engine shrouds, such as 318, are coupled to the rider platform 332 at connection points 334. The rider platform can be formed from a flexible material. When a rider stands on the platform and shifts their weight from quadrant to quadrant, the rider platform can flex. The flex can cause the pivot arm coupled to each of connection points 334 to move downwards which causes the hover engine coupled to each pivot arm to tilt. As described above, when the hover engine is tilted, a force can be generated which is approximately aligned with the tilt axis.

The rider can shift their weight and the amount of weight distributed to each pivot arm by changing their foot position on the rider platform 332 and the amount of weight distributed to each foot. Thus, the amount of force distributed to each pivot arm can be controlled and hence the amount of tilt to each hover engine can be varied. By varying the tilt, an amount of translational force output by each hover engine in a particular direction can be controlled. As described above, these forces can be used to control spin, such as starting or stopping a spin and controlling a rate of spin. The forces can also be used to steer the hoverboard.

In particular embodiments, different thickness platforms with greater or less stiffness can be used for different weight riders. For example, a stiffer platform may be used for heavier riders and a less stiff platform can be used for lighter riders. The support structure 302 can include a quick release mechanism which allows rider platforms with a different amount stiffness to be easily removed and then replaced. In another embodiment, adjustable stiffeners, such as springs which can be tightened loosened can be provided. The adjustable stiffeners can be used to increase or decrease the relative stiffness of the rider platform 332.

In one embodiment, the hoverboard can be configured to receive one or more extension arms. The extension arms can attach to the board on one end and can include an attachment on the other end, such as a skid pad, a wheel, a castor wheel. The one or more extension arms may be used to limit the amount of tilt of the hoverboard and provide additional stability. For example, during training, the extension arms might be used in a similar manner as training wheels are used on a bike, FIG. 11 is a side view 350 of a hoverboard. As can be seen in the FIG. 11 all of the components need to operate the hover engines, such as the batteries and speed controls are suspended from the bottom of support structure 302 and packaged below a height of the bottom of the hover engine. As described above, the height of the hoverboard from the bottom of the hover engine to the top of the rider platform is about 4.5 inches Thinner designs are possible and this example is provided for the purposes of illustration only.

In this embodiment, the rider platform 332 is supported at the ends and coupled to the structure 302 via members 374a and 374b. This configuration allows the rider platform 332 to bend in the middle, such as when weight is applied at location 354 and 356 above the pivot arms, such as 310. In an alternate embodiment, the rider platform may be supported by a member, which bisects it lengthwise. Then, the rider platform 332 may be bent on either side of this central member when weight is applied.

In yet another embodiment, the rider platform 332 may be sectioned to allow portions to move independently of one another. The individual sections can be coupled to the hoverboard such that they may be flexed to actuate one of the tilt mechanisms. In another embodiment, the individual portions may be coupled to the hoverboard via a hinge mechanism. The individual portions can then be rotated about the hinge.

When a hinge mechanism is used, a stiffer material may be utilized for the individual section. However, a repositioning mechanism, such as one or more springs or flexible foam, may be used to return the individual portion to an original position after a force is removed. The repositioning mechanism, such as springs, can also be used to affect the amount of force required to move the individual section.

The hover engine shrouds are coupled to a hinge mechanism 372. The hinge mechanism 372 hangs from the support structure 302. The hinge mechanism provides for rotation about one axis. Some examples of hinge mechanisms which may be utilized include but are not limited to a butt hinge, a barrel hinge, a flush hinge, a continuous hinge, a pivot hinge, a coiled spring pin hinge and self-closing hinges. A gap is provided beneath the hinge mechanism, the gap allows wires 308b from the speed controller 306b to reach the motor 365 encircled by the shroud 318. The electronic speed controllers, such as 306b, are each connected via connectors, such as 316b, to four adjacent battery packs (see FIG. 9). In alternate embodiments, the shroud 318 can include one or more apertures (e.g., 367) which allow wires to be passed to the motor 365.

In this example, the hinges allow each hover engine to rotate through some angle, such as 366 and 369, about one rotational axis. As described with respect to FIG. 14, joints which allow for more rotational degrees of freedom are possible and this example is provided for the purposes of illustration only. The bottom of the shrouds, such as 318, when tilted is illustrated by the dashed line 362 and 364. The tilt angles 358 and 360 are defined as the angle between the shrouds are horizontal and the bottom of the shrouds when tilted as indicated by lines 362 and 364.

In one embodiment, the support structure 302 around the hinge mechanism 372 can be partially recessed. The recess may allow a portion of the hinge mechanism 372 to slide up into the recessed portion when a hover engine is tilted. This feature may allow the overall thickness of the hoverboard to be reduced since the clearance needed to rotate the hover engine may be reduced. In one embodiment, the support structure can be formed from materials, such as wood, metal, fiberglass (or other lightweight but strong composite materials), plastic and combinations thereof.

In one embodiment, the hover engines can be configured to tilt up to ten degrees in one direction. In operation, when the weight is removed from locations 354 and 356, the rider platform 332 may unbend and the shrouds may return to a first position. When weight is added, the rider platform may flex by some amount at each location and the shrouds may each tilt by some amount.

As described above, the amount of tilt associated with each hover engine may be constrained. Further, the amount of tilt doesn't have to be same for each hover engine. For example, one hover engine can be allowed to rotate up to ten degrees while a second hover engine can be allowed to rotate up to only five degrees. In particular embodiments, a hover engine can be configured to rotate through up to 10 degrees, up to 20 degrees or up to 30 degrees of total rotation. The rotation directions 366 and 368 are shown for each hover engine. In one embodiment, each hover engine is allowed to rotate in only one direction. In another embodiment, a hover engine may be allowed to rotate in two directions, such as angles of plus or minus ten degrees past the horizontal. In this embodiment, a different mechanical linkage would be needed, such as a second pivot arm coupled to the shroud (see e.g., FIG. 15).

Figure 12:
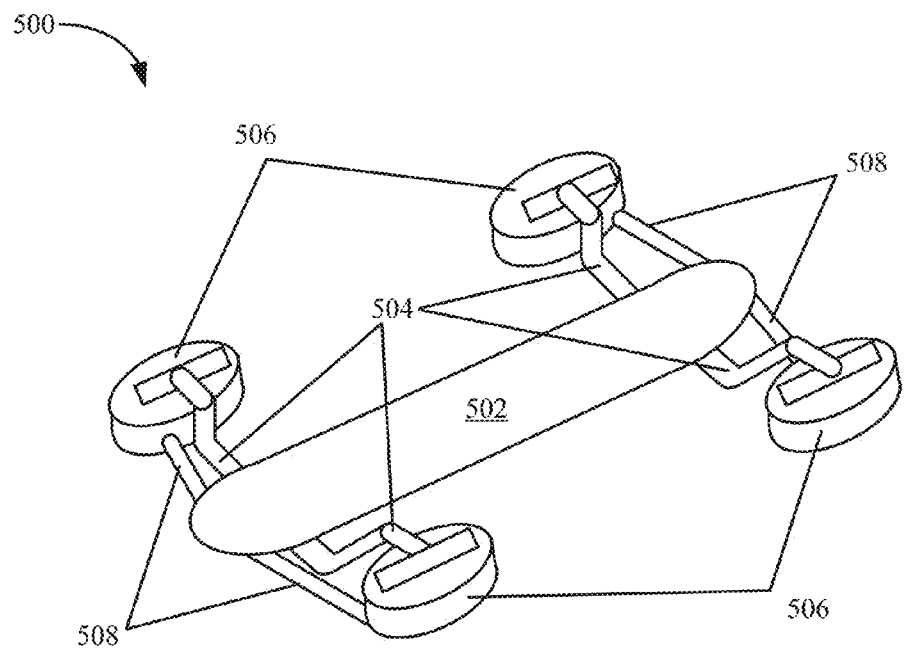
FIGS. 12 and 13 are a perspective view and side view of a hoverboard with hover engines coupled to struts in accordance with the described embodiments.
Figure 13:
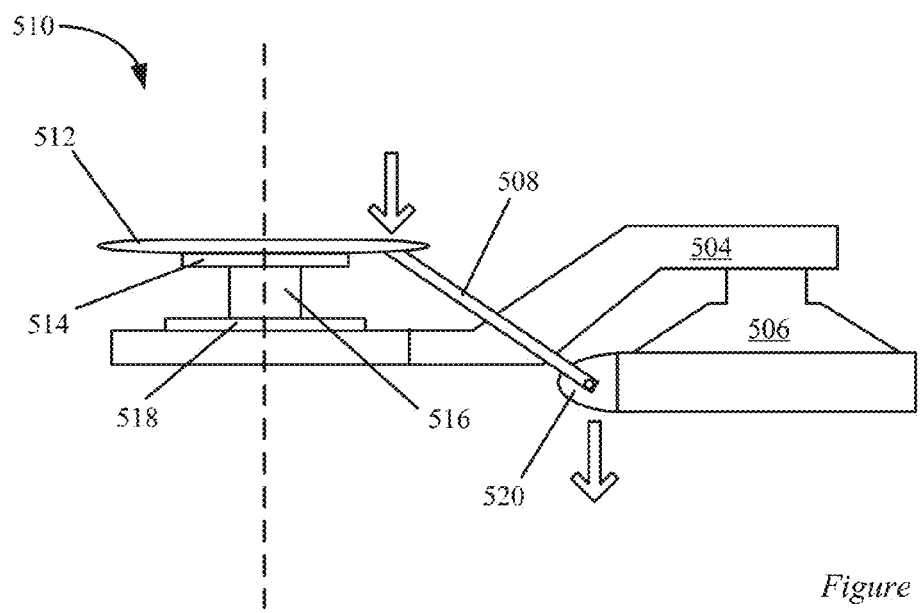

FIGS. 12 and 13 are a perspective view and side view of a hoverboard 500 with four hover engines 506 coupled to struts 504. A rider platform 502 is coupled to the struts 504 and four pivot arms 508. The rider platform 502 is coupled to support member 516 via connector 514. The support member 518 is coupled to the struts 504 via connector 518.

In one embodiment, the rider platform 502 can be flexible, such that when a force is applied near its edge support member 508 is pushed down and the hover engine is also pushed down. A different mechanical linage can be provided such that a downward motion causes the hover engine to be tilted in the opposite direction.

FIGS. 14, 15 and 16 show some embodiments involving manual STARM control. In particular, FIGS. 14, 15 and 16 are illustrations of a hover engine coupled, respectively, to a lever arm, foot pedals and reins. These controls might be used in combination with the previously described hoverboards.

In FIG. 14, a lever arm 602 is coupled to a motor/STARM via a ball joint 606. When hovering, a movement of the lever arm 602 from side to side can cause the STARM 610, which includes an arrangement of magnets 612, to tilt relative to a conductive surface such that a vehicle including the hover engine moves forward and backward. The amount of side to side tilt can affect the speed at which a vehicle moves in these directions. A movement from front to back can cause the STARM 610 to tilt such that the vehicle moves either left or right. A combination of a left or right movement and a front or back movement of the lever 602 can tilt the STARM such that the vehicle moves in various directions along different lines. A change in the lever direction as a function of time can change the direction vector of the force which is generated as a function of time and hence the vehicle can move along an approximately curved path.

In various embodiments, a mechanical linkage can be used which causes one or more hover engines to be tilted in response to a movement of the lever arm 602. For example, two hover engines can be coupled to a common rotational member such that both hover engines are rotated in response to a torque applied to the rotational member (see e.g., FIG. 20). In addition, as described above, digital controls can be used where a movement of the lever arm 602 is detected by one or more sensors. The sensor data can be received in an on-board processor. Based such factors, as an amount movement, a direction of movement and a rate of movement of the lever arm 602 and other factors, such as a current orientation and direction of motion of the vehicle, the on-board processor can generate one or more commands. The commands can be sent to one or more actuators via wired or wireless communications. The actuators can include logic devices (e.g., controllers) which enable communications with the on-board processor and interpreting of commands from on-board processor.

The one or more actuators can be coupled to a single hover engine or a plurality of different hover engines. In response to receiving the commands, the actuator controller can cause the actuator of output a force or a torque. The force or torque can cause the hover engine to change its position in some manner, such as but not limited to a tilt position.

In some embodiments, the on-board processor can send commands, which cause a rotation rate of a STARM associated with a hover engine to go to a particular RPM value. The motor commands, which can be received by motor 608, can be generated in conjunction with the actuator commands. The RPM value can affect the amount of force which is generated from the hover engine after its position has been changed. The motor 608 can include one or more controllers for 1) communicating with the on-board processor (wired or wirelessly), 2) processing the commands received from the on-board processor and 3) generating commands to control mechanisms associated with the motor which are used to implement the command, such as an amount of power delivered to the motor.

FIG. 15 shows foot pedals, 652, which can be used to tilt hover engine including a motor 662 and a STARM 664. When one foot pedal, 652, is pressed downwards, the STARM 664 can generate a force, perpendicular to the page, which can cause the vehicle to move forward. When the other foot pedal is pressed downwards, the STARM 664 can generate a force, which can cause the vehicle to move backwards. The amount each pedal is depressed can be used to control a speed of the vehicle in a particular direction. When a first pedal is pressed to move the vehicle in one direction, removing pressure from the first pedal and applying pressure to the second pedal can act as a brake to slow the vehicle.

A mechanism is provided with each foot pedal which generates a restoring force. It can also be used to affect how much force needs to be applied to a pedal to move the pedal. Further, the mechanism can limit how far the pedal can move. In FIG. 15, the mechanism is represented as a spring. The mechanism can generate a force which is approximately linear and/or non-linear with the amount of displacement of the foot pedal. In particular embodiments, one or more mechanisms which generate a restoring force can also be used with the lever arm shown in FIG. 14. Again, as described above, one or more foot pedals can be used as part of a digital control system.

FIG. 16 is an illustration of a hover engine coupled to reins 672 and 674. The reins, 672 and 674, are attached to a housing via connection points 680 and 682. A force, such as 676 and 678, can be applied one at a time or simultaneously to change a tilt angle of the STARM 664. When one or both reins are not in tension, then no force is applied to the hover engine including motor 662 and STARM 664.

In one embodiment, a restoring force mechanism can be provided, such as springs 654, which are configured to return the STARM to a neutral position (the neutral position can involve the STARM 664 being horizontal or in a tilted position). To maintain a particular tilt angle, a constant force is applied to one or both reins. When the force is removed, the STARM 664 returns to its neutral position.

In another embodiment, the mechanism can be resistant to movement such that the STARM 664 remains in place at a particular orientation after it is moved. For example, the ball joint 656 or other hinge mechanism can be formed with sufficient internal friction to hold the STARM 664 in position. In this embodiment, a first combination of forces can be applied to the reins, 672 and 674, to move the STARM 664 to a first orientation where it remains in place in the absence of an externally applied force. To move the STARM 664 to a second orientation, a second combination of forces can be applied via the reins 672 and 674.

FIGS. 17A to 17E are illustrations of shroud configurations for a hover engine 706. The hover engines each include a motor 702 and a STARM 704 which rotates in direction 712. The motor 702 and STARM 704 are configured to rotate 708 about rotation axis 710.

Figure 17A:
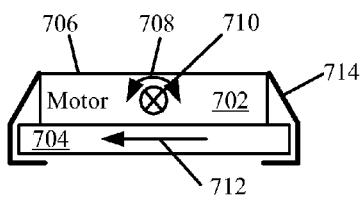
FIGS. 17A to 17E are illustrations of shroud configurations for hover engines in accordance with the described embodiments.

In FIGS. 9, 10 and 11, the shroud extended around the sides of the STARM such that the bottom of the shroud was parallel to or extended slightly past the bottom of the STARM. In this embodiment, the bottom of the STARM is exposed. In FIG. 17A, a shroud 714 extends beneath the STARM 704 and partially covers a bottom of the STARM. The lip portion which extends beneath the STARM can prevent debris from entering the side of the STARM. In addition, the bottom portion can provide a minimum stand-off from a substrate which supports the induced eddy current. During start-up, the minimum stand-off can reduce a maximum amount of drag torque which is generated because the drag torque decreases exponentially with a distance from the substrate (e.g., see FIG. 4B).

Figure 17B:
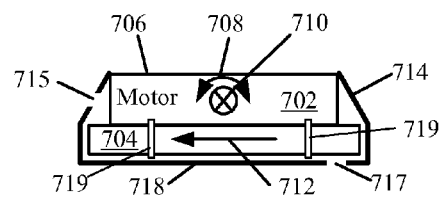

In FIG. 17B, a bottom portion 718 of the shroud 714 completely encloses a bottom of the STARM 704. In one embodiment, the shroud 714 can include apertures (e.g., 715 and 717) which allow air to enter and exit the shroud 714. The air flow may be used to provide a heat exchange mechanism for the STARM. The STARM may include fins (e.g., 719) to increase air flow within an enclosure. Further, aperture locations may be selected to increase air flow through the enclosure. The apertures may be covered with a mesh to prevent debris from entering the enclosure.

In another embodiment, the motor 702 and STARM 704 may be completely enclosed. The enclosure can be evacuated such that it operates at a pressure lower than the surrounding environment. Thus, the enclosure may include a pressure sensor and a valve for removing air. Alternatively, the enclosure may be filled with a gas different from the surrounding environment. For example, the enclosure may be filled with nitrogen or an inert gas, such as argon or xenon. In this embodiment, the pressure may to which the enclosure is filled may be lower, approximately equal to or above an ambient pressure surrounding the enclosure.

In yet another embodiment, an entire vehicle can be enclosed in a shell. For example, a flying saucer shaped vehicle can be built. The motor, batteries, STARMs, control circuitry and other vehicle components can be disposed within the shell. In this configuration, an enclosure and/or shroud may not be needed around the motor and STARM because the motor and STARM are disposed within the shell. Like enclosure in the previous paragraph, the shell can be configured to operate at a pressure which is different than the surround environment and/or can be filled with an atmosphere which is different than the surround environment.

In FIGS. 17A and 17B, the motor 702, the STARM 704 and shroud may be tiltable as a unit. In FIG. 11, the motor, STARM and shroud are also tiltable as a unit. In other embodiments, as described as follows with respect to FIGS. 17C and 17D, the motor 702 and STARM 704 are tiltable as a unit while the shroud 714 remains in a fixed position.

Figure 17C:
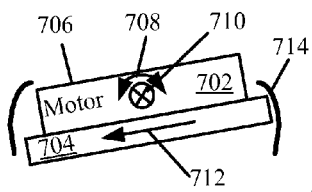

In FIG. 17C, the motor 702 and STARM 704 are configured to tilt about axis 710 while shroud 714 remains fixed. The bottom of the shroud 714 is open and doesn't include a lip portion as shown in FIG. 17A to allow the STARM to tilt past the horizontal. The inner sides of the shroud 714 are curved accommodate the rotation of the STARM.

Figure 17D:
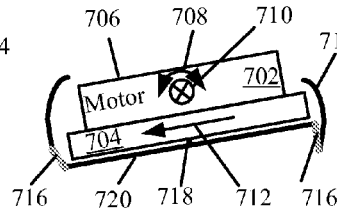

In FIG. 17D, a bottom portion 720 of the shroud 714 is provided which doesn't rotate with the STARM in direction 712. To allow 720 not to rotate with STARM 704, it can be mounted to a static portion 718 which extends through STARM 704. However, the bottom portion 720 is configured to tilt as the motor 702 and 704 tilt.

In one embodiment, a flexible membrane 716 can be provided which couples the bottom portion 720 to the side of the shroud 714. The bottom portion can be formed from a rigid material. The membrane 716 can stretch as the motor 702, STARM 704 and bottom portion 720 of the shroud tilt. The tension in the membrane 716 can be used to restore the STARM and motor to a neutral position after it has been tilted.

Figure 17E:
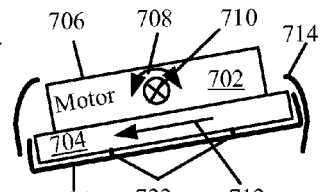

In FIG. 17E, a two part shroud is used. A first portion of the shroud 714 extends down the sides of the motor 702 and STARM 704. The first portion 714 is open and doesn't tilt with the motor 702 and STARM 704 or rotate with STARM 704. A second portion 724 of the shroud is mounted to bottom of STARM. The second portion 724 is configured to tilt with the motor 702 and STARM 704 and rotate with the STARM 704.

The second portion 724 of the shroud extends around the side of the STARM 704. In one embodiment, the portion which extends around the side of the STARM is selected so that it extends above a bottom of the first portion of the shroud 714 when the STARM is tilted at the maximum angle. Spacers 722 are provided which provide a stand-off distance between the STARM 704 and the second portion of the shroud. In alternate embodiments, the second portion of the shroud 724 can be mounted directly to the STARM 704 without any standoff distance.

In FIGS. 17C, 17D and 17E, an actuator can be used to tilt the motor 702 and STARM 704. In one embodiment, the actuator may be located outside the shroud. The shroud can include one or more apertures which allow a mechanical linkage to extend from actuator and into the shroud. The mechanical linkage can be used to transfer a torque from the actuator to rotate the motor and the STARM.

For example, a rigid L-shaped lever arm can expend from the shroud where the arm is pushed up or down to rotate the motor and the STARM. The lever arm can be pushed by an actuator or via a force from a person's body, such as their foot. In another embodiment, a straight rotational member can extend from the actuator which is coupled to the motor and the STARM. The motor and the STARM can receive a torque from the rotational member.

In yet another embodiment, one or more actuators can be located inside the shroud. An actuator can be coupled to a static portion of the motor and a static portion of the shroud. The actuator can be then configured to generate a force which tilts the STARM and the motor.

Next, shroud configurations are described where the shroud is tiltable and also forms a portion of the rider platform. FIGS. 18A to 18D are illustrations of examples of shroud configurations for a hover engine where a top of the shroud forms a portion of the rider platform. A rider may be able to directly step on a portion of the shroud to tilt the shroud, motor and STARM as a unit which causes a translational force to be generated.

Figure 18A:
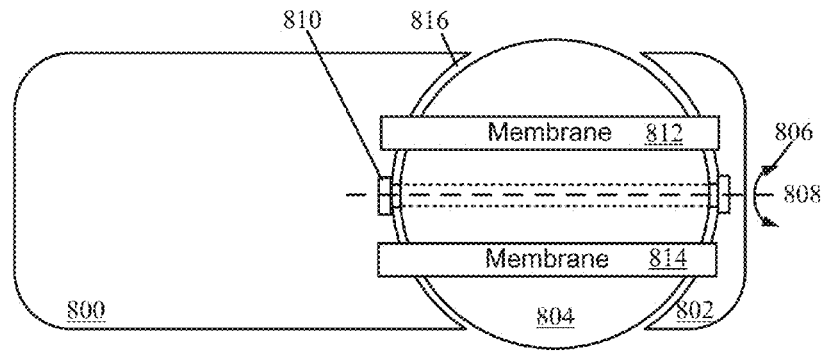
FIGS. 18A to 18D are illustrations of shroud configurations for hover engines where a top of the shroud forms a portion of the rider platform in accordance with the described embodiments.

In FIG. 18A, a rider plate platform including three portions 800, 802 and 804 is provided. The second portion 804 is part of a shroud which is coupled to a motor and STARM (not shown). A structural member 810 extends from the first portion 800 and through the shroud 804. The third portion 802 of the rider platform 802 is coupled to the structural member 810. In this embodiment, the first portion 800 and the third portion 802 are configured to move as unit. In alternate embodiments, structure can extend around one or both of sides of second portion 804 such that first portion 800 and the second portion 802 are joined with one another to extend around all or a portion of the circumference of second portion 804.

The second portion 804 can be configured to rotate 806 around axis 808 which is through the center of member 810. For example, portion 804 can be formed with a hollow tube through which member 810 extends. In this example, member 810 may be cylindrically shaped. Other types of hinge mechanisms can be provided which allow rotation between the member 810 and the second portion 804. Thus, the tube structure is provided for the purposes of illustration only and is not meant to be limiting. In particular, member 810 doesn't necessarily have to be cylindrically shaped.

In one embodiment, in a first position, the top surface of 804 is substantially parallel to the adjacent top surfaces of 800 and 804 across gap 816 such that a continuous surface is formed. In another embodiment, in the first position, the top surface of 804 can be slightly above the adjacent top surfaces of 800 and 802. The discontinuity between the surfaces may allow a rider to detect a position of their foot relative to the top surface 804 and portions 802 and 804.

A force can be applied on the top surface of 804 to cause it to tilt about axis 808. The direction of tilt depends on which side of tilt axis 808 a net force is provided as forces from a source, such as a rider's foot, can be distributed across the top surface. Upon tilting, a portion of the top surface of 804 rises above an adjacent top surface of 800 and 802 and a portion of the top surface of 804 sinks below an adjacent top surface of 800 and 802. This tilt can cause a translational force to be generated where the magnitude of the force depends on the magnitude of the tilt angle, the direction of the tilt, as well as the overall orientation of the hoverboard relative to the substrate which supports the eddy currents. The direction of the tilt can affect the direction in which a translation force is generated.

A structure can be provided which provides a maximum limit to the tilt angle in either direction. As described above, the maximum tilt angle does not have to be the same in each direction. Further, the tilt potential can be limited such that 804 can tilt in only one direction.

The tilt mechanism, such as a hinge, can be configured to resist to tilting such that it can maintain a tilt angle. For example, the tilt mechanism can be designed with a certain amount of friction between parts which may need to be overcome to tilt portion 804 about axis 806. Thus, an external force, such as from a rider, is applied each time the tilt mechanism is moved from one position to another position.

In another embodiment, the tilt mechanism can include restoring force mechanisms which provide a restoring force, such as springs, membranes or actuators. After portion 804 is tilted in a first direction to a first position, a restoring force mechanism can be configured to generate a moment which acts to tilt the portion 804 opposite the first direction. The restoring force mechanisms can be configured to generate a restoring force which helps to move surface 804 in a particular direction along or conjunction with an externally provided force.

As an example, a user can press on portion 804 with their foot to tilt portion 804 from a first position to a second position. When the user removes their foot, the restoring force mechanism can be configured to tilt portion 804 from the second position to the first position. As another example, a user can press on portion 804 with their foot to tilt portion 804 from the first position to the second position. When the user removes their foot, the portion 804 may maintain the first position. However, if the user applies a small amount of force in conjunction with the force output from the restoring force mechanism, the portion 804 is tilted in the opposite direction.

In one embodiment, a restoring force mechanism can be an actuator which is powered from a source other than a user. In another embodiment, the restoring force mechanism can be a device, such as but not limited to springs or flexible membranes, which stores energy applied from the user. The stored energy can be released to supply the restoring force.

In another embodiment, a flap can be utilized. The flap can be formed a flexible but rigid material to allow it to be anchored on one side and then bent. The flap can be designed to return to its unbent shape which generates a restoring force.

As an example, flexible membranes 812 and 814 can be attached to surfaces 800 and 802. The membranes are shown over the top of portion 804. In other embodiments, membranes can be located on the sides of portion 804 or run beneath portion 804. The attachment points for the membranes can also be on the sides of portion 800 and 802 or on a bottom surface of 800 and 802.

In one embodiment, membranes 812 and 814 may be only attached to 800 and 802 such that when portion 804 is tilted in a particular direction only one of membranes 812 and 814 is stretched. The membrane which is not stretched doesn't generate a restoring force. In another embodiment, one or both of membranes 812 and 814 are attached, such as glued or fastened, to portion 804. For the membranes attached to portion 804, the membranes are stretched when the top portion is rotated past the horizontal in either direction.

In various embodiments, to accommodate rider preferences, the width or thickness of membranes 812 and 814 can be adjusted to increase the amount of force required to stretch. Further, membranes don't have to be of equal thickness or width (e.g., see FIG. 21). Thus, more energy may be required to tilt 804 in one direction versus the opposite direction.

In another embodiment, a single membrane can be used. When an equal amount of membrane is placed on either side of axis 808, the amount of energy required to tilt 804 from the horizontal in either direction can be equal. When more membrane is placed on one side of axis 808 than the other, more energy can be required to tilt 804 in one direction versus the opposite direction. The membranes don't have to stretch across the entire top of 804 from 800 to 802. For example, membranes can be attached which span gap 816 and are anchored to portions 800 and 804 and/or are anchored to portions 802 and 804.

The top surfaces of 800, 802 and/or 804 can be recessed where a membrane is attached and/or spans the portion. The recess can allow the membrane to be attached in a manner where it is flush with the adjacent portions. Thus, the depth of the recess can depend on the thickness of the membrane and bonding agent which is used.

Figure 18B:
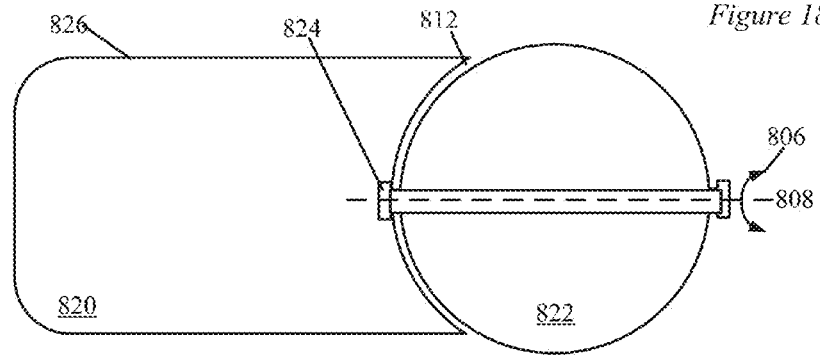

In FIG. 18B, a rider platform is formed from the top surfaces of structure 820, member 824 and hover engine 822. The member 824 is anchored and can be integrated with board 820. Hover engine 822 is coupled to member 824 with a gap 812 between board 820 and hover engine 822. The gap 812 enables the board 820 and the hover engine rotate relative to one another.

In one embodiment, member 824 can be formed from two pieces which can rotate relative to one another, such as two tubular pieces. A housing or shroud associated with hover engine 822 can be coupled to one of the pieces. One or more springs, such as a spring disposed in the interior of member 824, can be used as a restoring force mechanism.

In FIGS. 18A and 18B, a single hover engine is shown. In other embodiments, the top surfaces from a plurality of hover engines can form a portion of a rider platform (see, e.g. FIG. 20). For example, in FIG. 18B, hover engine 822 may be reduced in diameter relative to the size of the board 820 and moved closer to side 826 of board 820 to allow two hover engines to be placed side by side. In this example, the tilt axes of each hover engine associated with the tilt mechanisms can be parallel to one another. In another embodiment, each of the two hover engines can be coupled to board 820 such that the tilt axes are non-parallel to one another. In this example, the two hover engines can be configured to have the same or a different range of tilt angle.

Figure 18C:
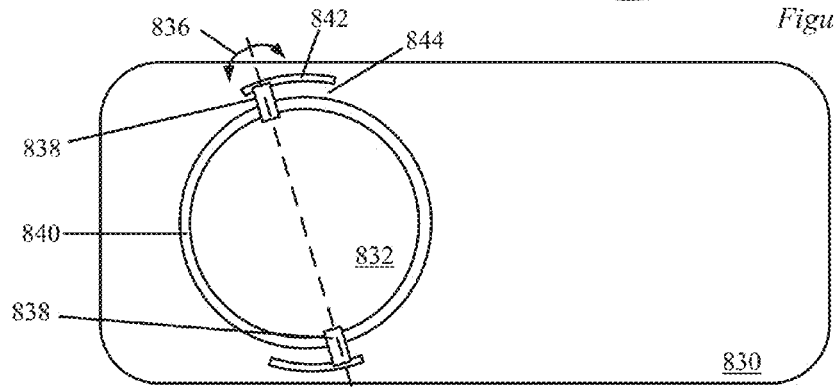
Figure 18D:
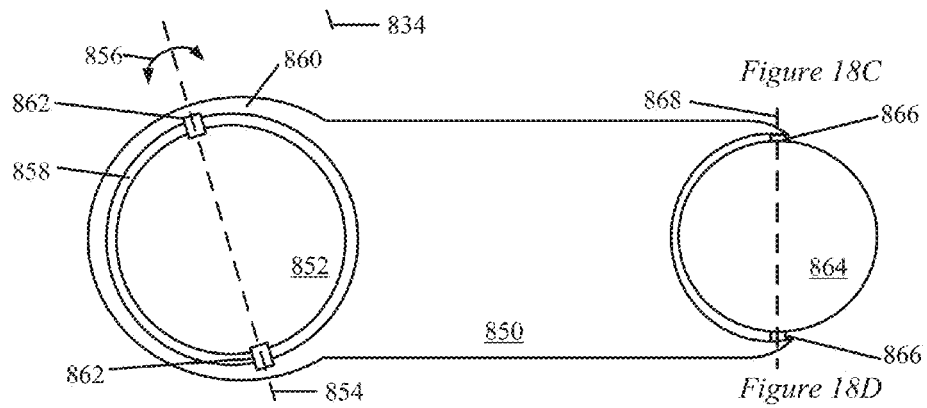

In FIGS. 18C and 18D, boards 830 and 850 surround hover engines 832 and 852, respectively. In FIG. 18C, a rider platform is formed from a top surface of the hover engine 832 and a top surface of board 830. In FIG. 18D, a rider platform is formed from a top surface of the hover engine 852 and the top surface of board 850.

In FIG. 18C, two tilt mechanisms, such as 838, are coupled to a shroud associated with hover engine. The tilt mechanisms allow the shroud to rotate 836 about axis 834. The gap 840 between the board 830 and the hover engine 832 allows the hover engine 832 to tilt relative to the board 830.

The board 830 is provided with slots, such 842. The rotation mechanism is coupled to the slot to allow the hover engine 832 to be moved in accordance with the path of the slot 842, which is curved in this example. A shift in position of the hover engine 832 along the slots, such as 842, changes the orientation of axis 834 relative to the board 830. A change in orientation of axis 834 relative to the board changes a direction of a translation force which is output from the hover engine 832 when its STARM is angled relative to a surface which supports the eddy currents. The direction of the translational force output from the STARM can affect a magnitude of a rotational moment which generated about a center of mass of the STARM.

In one embodiment, a fastener can be provided which fixes the position of the tilt mechanisms, such as 838, in the slots, such as 842. The position can be selected to suit a rider preference. During operation, the fastener is configured to hold the STARM in the selected position. I In another embodiment, the tilt mechanism 838 can be coupled to the board 830 in a manner such that its position along the slot 842 can be adjusted during operation of the hoverboard. This feature allows the hover engine to be tilted and a direction of the associated tilt axis to be adjusted in flight. In various embodiments, the force to change a position of the tilt mechanism in the slots, such as 842, can be provided from an actuator coupled to the hoverboard or from a force provided by the rider, such as from a rider's foot.

In FIG. 18D, two hover engines, 852 and 864, are coupled to board 850. The, first hover engine 852 is coupled to board 850 via tilt mechanisms 862. A thin piece 860 of board 850 extends around the hover engine 852. A gap 858 between the board 850 and the hover engine allows the hover engine 852 to rotate 856 about axis 854.

In one embodiment, the tilt mechanisms 862 can be coupled to a track, such as a slot in board 850 (not visible) formed below the top surface. The length of track can extend around all or a portion of the circumference of the hover engine. The tilt mechanisms can be rotated along the track to change an orientation of the tilt axis 854 relative to the board 850. In one embodiment, a top of the track can be substantially parallel to a top surface of board 850. In another embodiment, the track can be angled relative to a top surface of board 850 such that when the top surface of board 850 is parallel to the ground a STARM associated with the hover engine 852 is angled relative to the ground.

The second hover engine 864 is coupled to board 850 via tilt mechanism 866. A gap between the board 850 and the second hover engine 864 allows the hover engine to rotate around axis 868. In this example, the orientation of the tilt axis 868 is fixed relative to board 850.

In FIGS. 18A to 18D, when a top surface of the hover engine is parallel to the top surfaces of the adjacent structures which form the rider platform, a bottom of the STARM associated with the hover engine may be also parallel to the top surface of the hover engine. In this position, if the STARM is also parallel to the surface which supports the induced eddy currents, the translational forces output from the hover engine approach zero. In another embodiment, when a top surface of the hover engine is parallel to the top surfaces of the adjacent structures which form the rider platform, a bottom of the STARM associated with the hover engine may be angled to the top surface of the hover engine. In this position, if the top surface of the hover engine and rider platform is parallel to the surface which supports the induced eddy currents and the STARM is angled to the surface which supports the induced eddy currents, some amount of translation force can be output from the hover engine.

Figure 19A:
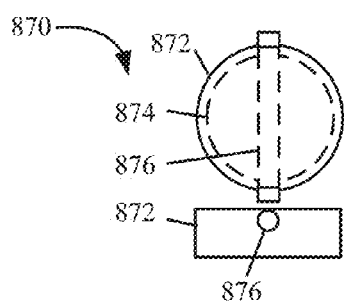
FIGS. 19A to 19C are illustrations of side and top views of tiltable hover engines in accordance with the described embodiments.
Figure 19B:
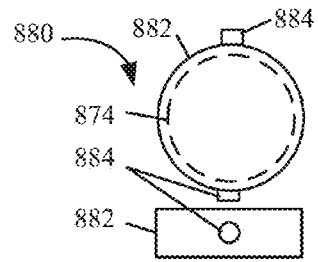
Figure 19C:
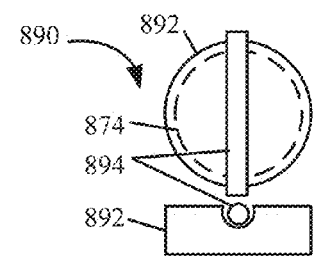

FIGS. 19A to 19C are illustrations of side and top views of tiltable hover engines. In FIG. 19A, a hover engine 870 is shown. The hover engine includes a shroud 872 and STARM 874 underneath the shroud. A tilt mechanism 876 extends through the shroud 872, such that a middle portion of the tilt mechanism is enclosed by the shroud. A motor may or may not be enclosed in the shroud. For example, the shroud can include an aperture which allows a belt or some other mechanism which provides a torque to turn the STARM to extend through the shroud.

In FIG. 19B, a hover engine 880 is shown. The engine 880 includes a shroud 882 and STARM 874. In this example, tilt mechanisms 884 are coupled to the side of shroud 882 and extend from the shroud 884. In various embodiments, the shroud, such as 882, can be formed with a slot for receiving a tilt mechanism, such as 884.

In FIG. 19C, a hover engine 890 is shown. The hover engine 890 includes a shroud 892 enclosing a STARM 874. In this embodiment, the shroud includes a recess configured to receive a tilt mechanism 894. The shroud 892 is coupled in some manner to the tilt mechanism 894.

Figure 20:
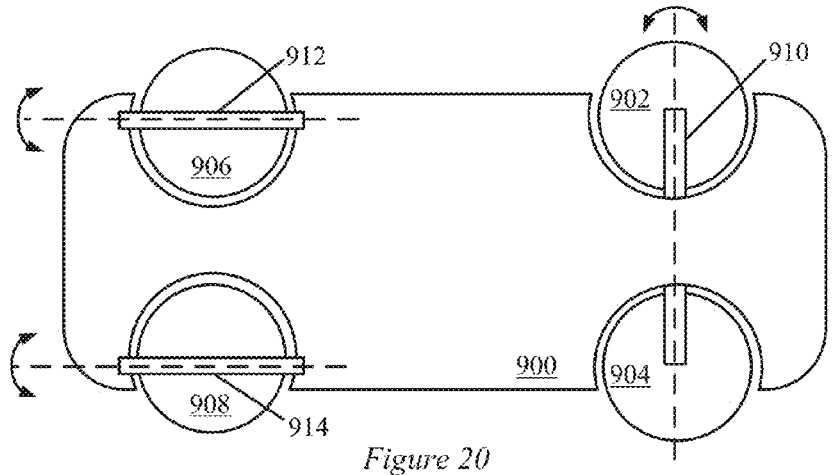
FIG. 20 is an illustration of a hoverboard with four hover engines in accordance with the described embodiments.

FIG. 20 is an illustration of a hoverboard with four hover engines 902, 904, 906 and 908. A payload platform (or rider platform) is formed from the top surfaces of hover engines 902, 904, 906 and 908 and board 900. Gaps are provided between the board 900 and the hover engines to allow the hover engines to rotate relative to the board 900. The hover engines are shown to be about the same size. In one embodiment, the four hover engines can be identical to one another except for the manner in which they are coupled to the hoverboard.

In this example, the two hover engines are coupled to a single tilt mechanism 910. The single tilt mechanism is coupled to board 900 and is configured such that hover engines 902 and 904 tilt in unison. The hover engines are shown to both rotate around a single tilt axis. In alternate embodiments, the ends of rotational member 910 can be angled to one another such that hover engines, 902 and 904, rotate about different tilt axes.

The hover engines 906 and 908 are coupled to a tilt mechanism 912 and 914 respectively. These hover engines may be tilted independently of one another and hover engines 902 and 904 respectively. The hover engines 902, 904, 906 and 908 can be configured to be tilted in response to an external force provided by a person and/or an actuator. For example, the hover engines can all be tilted in response to a force supplied by the rider. As another example, hover engines 902 and 904 can be tilted in response to a force supplied by a rider whereas hover engines 906 and 908 can be tilted in response to a force provide by an actuator. In yet another example, all the hover engines can be tilted in response to an actuator supplied force.

Figure 21:
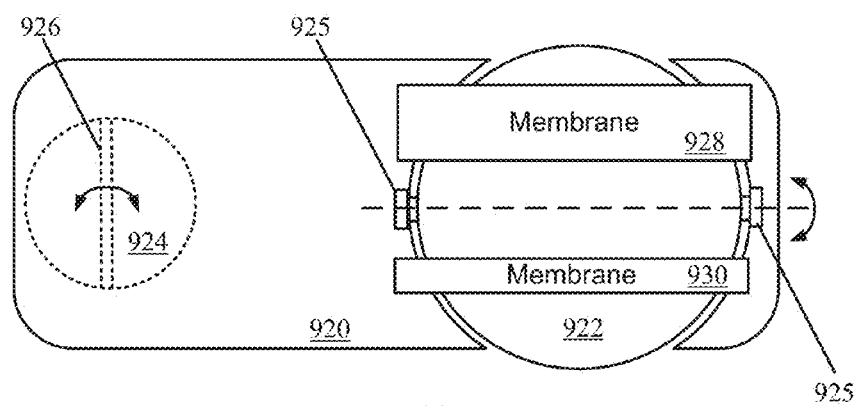
FIG. 21 is an illustration of a hoverboard with two rotatable hover engines in accordance with the described embodiments.
Figure 22A:
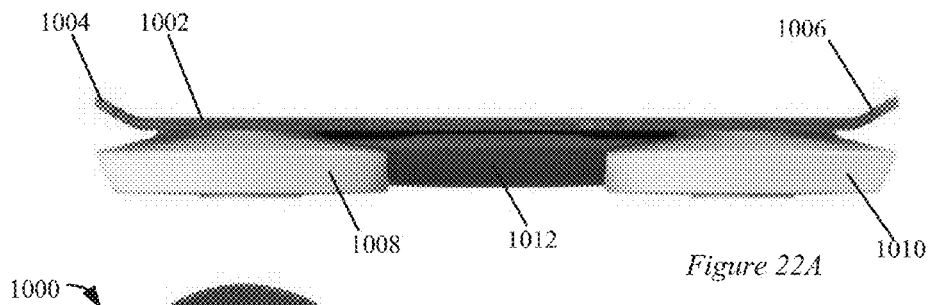
FIGS. 22A to 22D and 23 are illustrations of a hoverboard with two hover engines in accordance with the described embodiments.
Figure 22B:
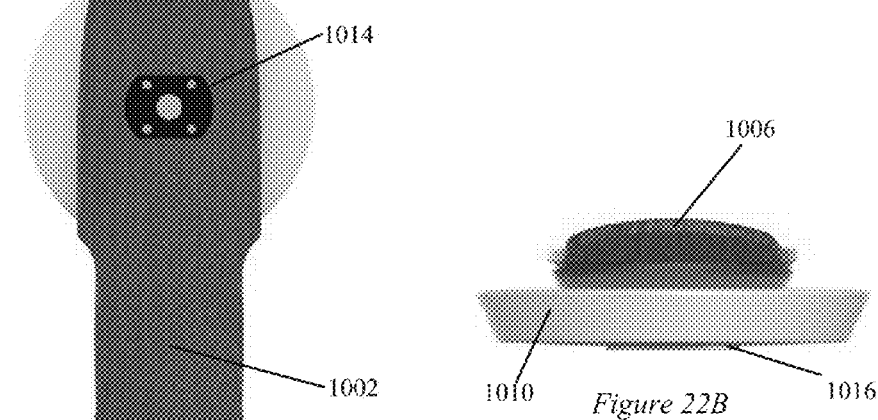
Figure 22C:
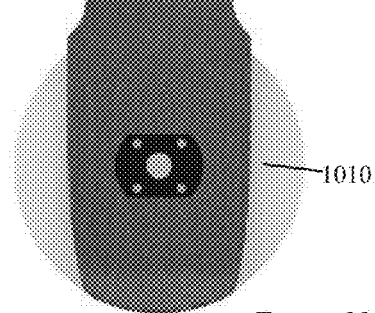
Figure 22D:
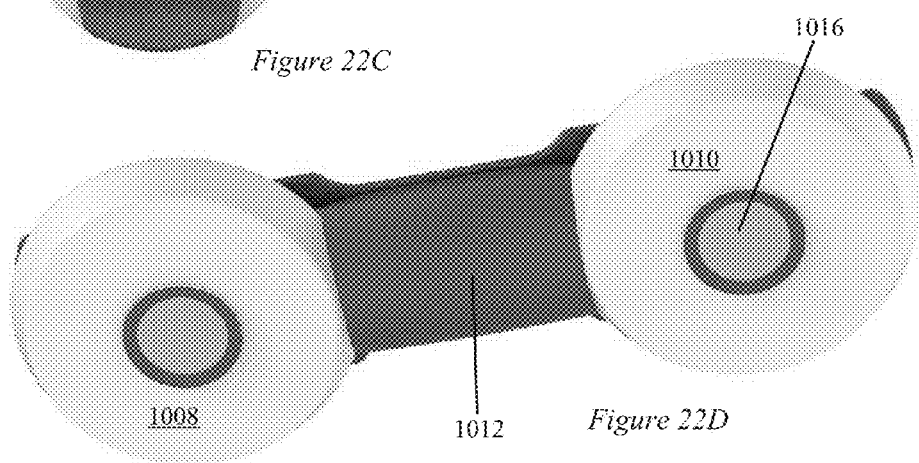

FIG. 21 is an illustration of a hoverboard with two tiltable hover engines 922 and 924. In this example hover engine 922 is coupled to board 920 via rotational mechanisms 925 such that it can rotate through the board and a top surface of the hover engine forms a top surface of board 920. Hover engine 924 is coupled to rotation mechanism 926 on a bottom surface of board 920. Thus, it doesn't rotate through board or form a portion of the rider platform.

In this example, two flexible membranes 928 and 930 are provided to generate a restoring the force. The membranes are of different widths, equal thicknesses and formed from the same material. Thus, more energy is required to tilt hover engine in one direction versus another direction. In other embodiments, the membranes can be formed from different materials and/or have different thicknesses.

The hover engines 922 and 924 are of different sizes. In one embodiment, hover engine 922 can be configured to generate more lift than hover engine 924, such as via a greater volume of magnets located on its STARM. In one embodiment, the hoverboard may be designed to hover using only the lift generated from hover engine 922. Hover engine 924 may configured to provide primarily control forces such as to steer the hoverboard left or right and keep the front portion of the hoverboard from hitting the ground.

FIGS. 22A to 22D and 23 are illustrations of a hoverboard 1000 with two hover engines. The rider platform 1002 is formed from wood. The rider platform 1002 includes end pieces, 1004 and 1006, which are angled upwards. Between the end pieces, the rider platform is substantially flat. When a user applies pressure to the end pieces a moment can be generated which causes one end of the board to rise relative to the other end of the board. Since the forces output by each hover engine are a function of their distance from the surface, raising one end can change the magnitude of forces associated with each hover engine and a distribution of forces across the hoverboard.

The two hover engines are each enclosed in a shroud 1008 and 1010. The shrouds 1008 and 1010 extend beyond the width of the rider platform 1002. The shrouds can be configured to support a rider's weight without impinging on a STARM rotating within the shroud. In one embodiment, the maximum diameter of the shrouds is about twelve inches.

The hover engines are coupled to the rider platform via interface with fasteners, such as 1014. A light, such as 1016, is provided at the bottom of each hover engine. An enclosure 1012 is suspended beneath the rider platform and between the hover engines. The enclosure can include such components as but not limited to a power source (e.g., battery backs), engine speed controllers, sensors, wireless communication devices, an on-board processor, wiring bundles, etc.

Figure 23:
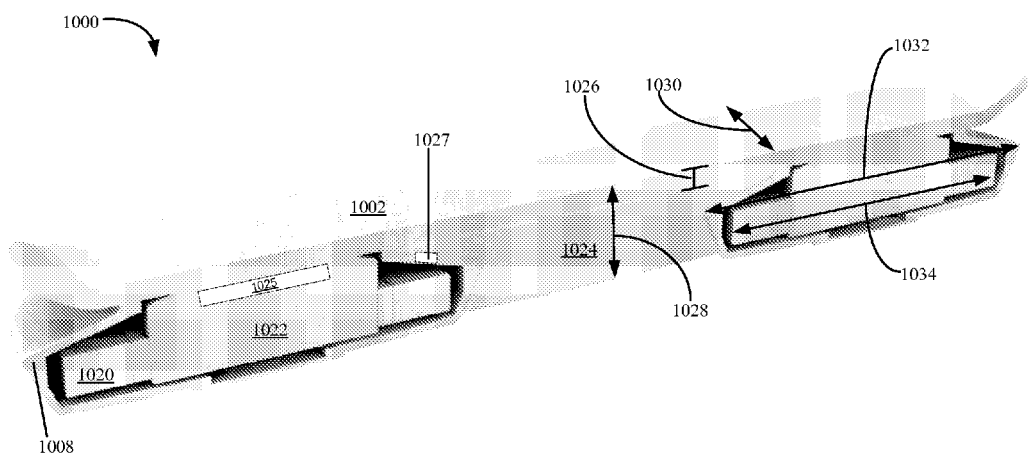

FIG. 23 is a cross section of the hoverboard 1000. The length from end piece to end piece is about thirty one inches. The thickness 1026 of the rider platform is about one half inch. The maximum width 1030 of half of the rider platform 1002 is about seven and one half inches. The height 1028 of the hover board 1000 from the bottom of enclosure 1024 to the top of the rider platform is about 3 inches.

Each hover engine includes a motor 1022 and STARM 1020. In this example, the hover engines are identical. In one embodiment, the engine speed controller 1025 can be integrated into the hover engine. The shroud 1008 can include apertures (e.g. 1027) to allow wire bundles to pass from enclosure 1024 into the interior of shroud 1008. In one embodiment, the bottom of the rider platform 1002 can include grooves for routing wire bundles from enclosure 1024 into the shroud 1008.

The maximum diameter 1032 of the shroud is about 12 inches. The diameter of the STARM is about eleven inches. The STARM is configured to accommodate magnets with a height from 1 to 1.5 inches. In one embodiment, the magnets can be cubic shaped.

Figure 24:
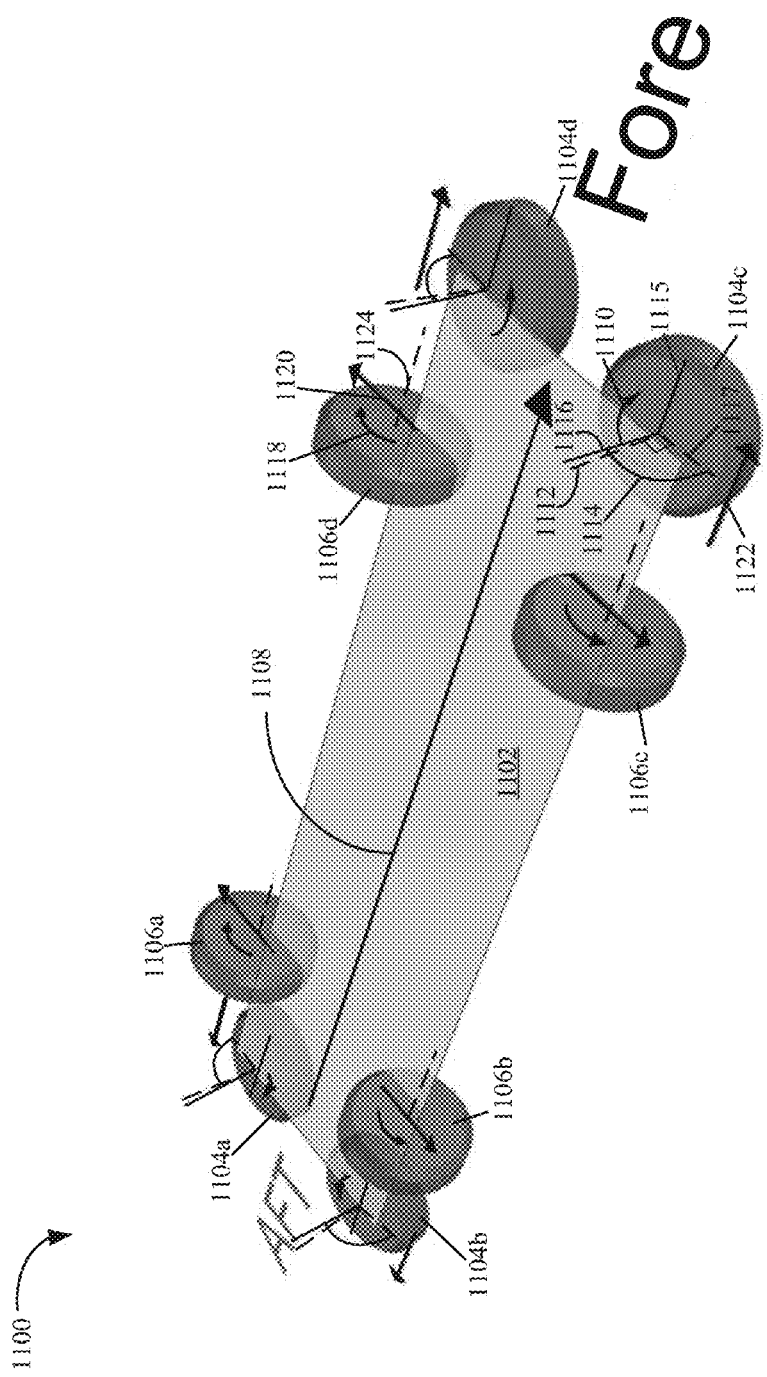
FIG. 24 is an illustration of a hoverboard with eight hover engines in accordance with the described embodiments.

FIG. 24 is an illustration of a hoverboard 1100 with eight hover engines, 1104a, 1104b, 1104c, 1104d, 1106a, 1106b, 1106c and 1106d. The eight hover engines are each coupled to a structure 1102. A potential direction of movement of the hoverboard 1100 is shown via arrow 1108. Various force distributions on structure 1102 which can lead to a particular direction of movement, such as 1108, are described in more detail with respect to FIGS. 25A to 25E. In particular embodiments, structure 1102 can be formed with flexible portions to allow bending and/or twisting. The bending and/or twisting can be used as part of a control strategy associated with the hoverboard 1100.

A direction of rotation, an axis of rotation and a direction of a translational force which is output from the hover engine when structure 1102 is proximately parallel to a substrate which supports eddy currents induced from the hover engines is shown for each hover engine. For example, hover engine 1104c is configured to rotate in direction 1110 about axis 1116 and generate a translation force in direction 1122. As another example, hover engine 1106d is configured to rotate in direction 1118 about axis 1124 and generate a translation force in direction 1120.

The hover engines 1104a, 1104b, 1104c and 1104d can be coupled to platform 1102 at an angled orientation which is fixed. A single angle of rotation is shown for each of the hover engines. For example, axis 1112 can be the axis of rotation of the motor and STARM for hover engine 1104c and axis 1116 can be perpendicular to a top surface of 1102. Angle 1114 can be ninety degrees plus the angle between axis 1112 and axis 1116. In general, the orientation of axis 1112 relative to an axis perpendicular to surface 1102 can be represented as rotation amounts about two axes, such as 1115 and 1117.

In this example, the axes of rotation of hover engines 1106a, 1106b, 1106c, 1106d are shown as parallel to surface 1102. In alternate embodiments, the axes of rotation of these hover engines can also be angled relative to a top of surface 1102. The orientation of these axes of rotation relative to surface 1102 can be also represented as rotation amounts about one or two axes.

In particular embodiments, in hover engines, 1104a, 1104b, 1104c and 1104d, the North-South poles associated with the STARMs can be substantially parallel to the axis of rotation, such as 1112. Some examples of magnet arrangements were described above with respect to FIGS. 2 and 3. In hover engines 1106a, 1106b, 1106c and 1106d, the North-South poles associated with the STARMs can be approximately perpendicular to the axes of rotation. In this configuration, hover engines 1106a, 1106b, 1106c and 1106d may generate some lift. However, in some embodiments, the hover engines 1104a, 1104b, 1104c and 1104d may generate a majority of the lift and hover engines 1106a, 1106b, 1106c and 1106d may be used primarily to output translational forces.

In various embodiments, in hover engines 1106a, 1106b, 1106c and 1106d, the magnets on the STARMs can be arranged such that all the poles are in the same direction, such as all north poles facing outwards. In another example, the poles can alternate, such as alternating north and south poles. In yet another example, magnet polarity arrangements such as those described with respect to FIGS. 2 and 3 can be used except with the poles rotated some amount, such as ninety degrees.

In FIG. 24, the four pairs of hover engines: i) 1106a and 1106b, ii) 1106c and 1106d, iii) 1104a and 1104b and iv) 1104c and 1104c are each configured to output a translation force which oppose one another. The hoverboard 11100 can be configured such that at some orientation all the forces and moments generated from the eight hover engines balance one another to allow the hoverboard to hover in place without rotating. For example, this condition may occur when surface 1102 is parallel to the surface which supports the induced eddy currents. When the board 1100 is in other orientations, a particular direction of movement can be generated. Some examples of these orientations are described in more detail with respect to FIGS. 25A to 25E.

FIGS. 25A to 25E are illustrations of movement directions in response to a force inputs at different locations on hoverboard 1100. In FIGS. 25A to 25E, the eight hover engines and the direction of their output force previously described with respect to FIG. 24 are shown. In addition, a location where a force can be applied and a resulting direction of movement of the hoverboard are discussed.

In one embodiment, the two hover engines, such as 1106a, 1106d and 1106b and 1106c can be replaced and a single cylinder with a single motor, like a rolling pin, can be used. Magnets can be arranged on the face of the cylinder in rows and columns which span all or a portion of the length of the cylinder and all or a portion the circumference around the cylinder. When arranged in this manner, the diameter of the cylinder may be smaller than the diameter of the hover engines, 1104a, 1104b, 1104c and 1104d. The rotating portion of the cylinder can be covered in a shroud to prevent the rider from stepping on it. The shroud may form a side rail on the board.

Figure 25A:
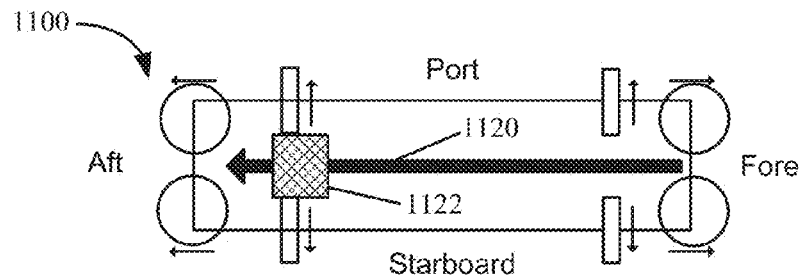
FIGS. 25A to 25E are illustrations of movement directions in response to a force inputs at different locations on a hoverboard in accordance with the described embodiments.

In FIG. 25A, a force can be applied within area 1122, which is indicated by the rectangle. For example, the force may be applied by a rider placing their foot in the area 1122 and then pushing down and shifting their weight towards it. This motion can cause a fore of the hoverboard to rise relative to a substrate which supports the eddy current induced by the hover engines. When the fore end of the hoverboard 1100 rises, due to the increased distance of the fore hover engines from the substrate, the translational forces output from the fore hover engines decrease and the translation forces from the aft hover engines increase. Thus, a net translation force 1120 can be generated which moves the hoverboard in the aft direction.

Figure 25B:
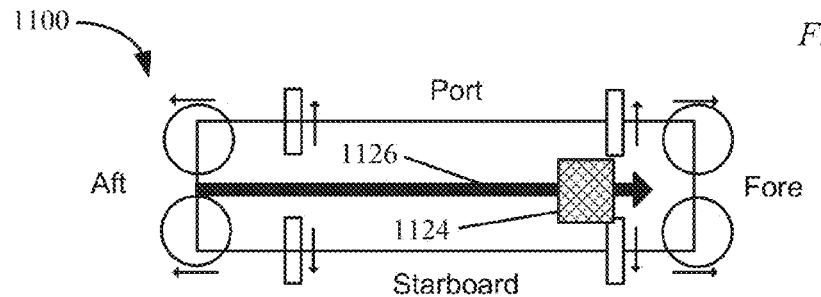

In FIG. 25B, a force can be applied within area 1124, which is indicated by the rectangle. For example, the force may be applied by a rider placing their foot in the area 1124 and then pushing down and shifting their weight. This motion can cause an aft end of the hoverboard to rise relative to a substrate which supports the eddy current induced by the hover engines. When the fore end of the hoverboard 1100 sinks and the aft end rises, due to the increased distance of the aft hover engines from the substrate, the translational forces output from the aft hover engines decrease and the translation forces from the fore hover engines increase. Thus, a net translation force 1126 can be generated which moves the hoverboard in the fore direction.

Figure 25C:
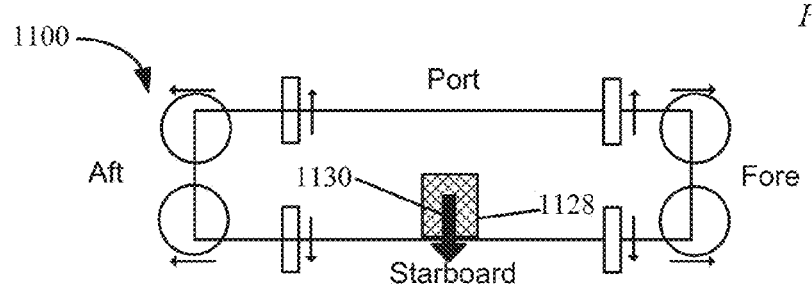

In FIG. 25C, a force can be applied within area 1128, which is near the center of mass of the hoverboard. For example, the force may be applied by a rider placing their foot in the area 1128 and then pushing down and shifting their weight. This motion can cause the port side of the hoverboard to rise relative to a substrate which supports the eddy current induced by the hover engines. When the starboard side of the hoverboard 1100 sinks and the port side rises, due to the increased distance of the port hover engines from the substrate, the translational forces output from the port hover engines decrease and the translation forces output from the starboard hover engines increase. Thus, a net translation force 1130 can be generated which moves the hoverboard in the starboard direction.

Figure 25D:
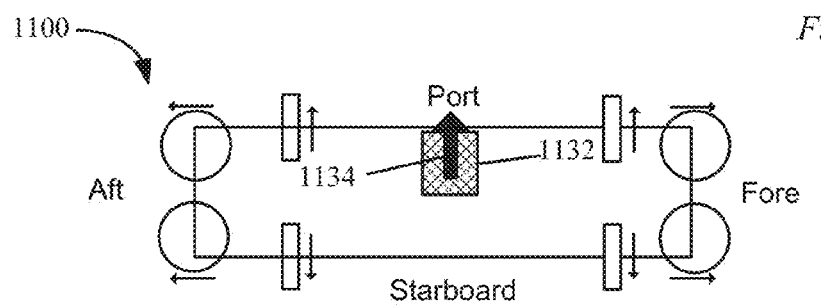

In FIG. 25D, a force can be applied within area 1132, which is near the center of mass of the hoverboard. For example, the force may be applied by a rider placing their foot in the area 1132 and then pushing down and shifting their weight. This motion can cause the starboard side of the hoverboard to rise relative to a substrate which supports the eddy current induced by the hover engines. When the port side of the hoverboard 1100 sinks and the starboard side rises, due to the decreased distance of the port hover engines from the substrate, the translational forces output from the port hover engines increase and the translation forces output from the starboard hover engines decrease. Thus, a net translation force 1134 can be generated which moves the hoverboard in the port direction.

Figure 25E:
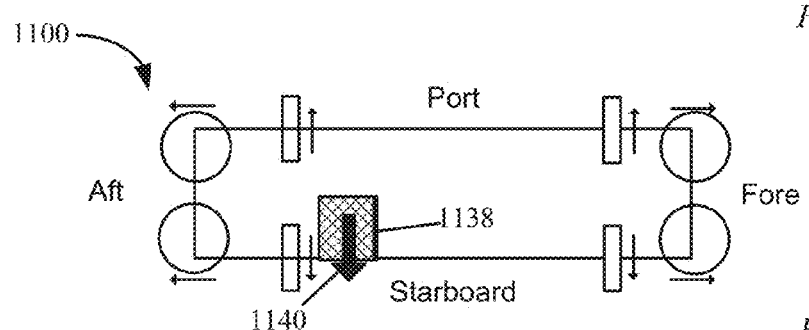

In FIG. 25E, a force is applied in area 1138, which may be some distance from the center of mass of the hoverboard and rider. The port and forward end of the hoverboard can rise. This orientation can cause at least a net force 1140 to be generated. The net force can produce a moment about the center of mass of the hoverboard and rider which causes the hoverboard to rotate. The area where the force is applied can be moved to the port side to generate a moment in the opposite direction and cause the board to rotate in the opposite direction.

In the examples above, the hoverboard was described as moving forward, backwards, side-to-side or rotating. These motions can be combined to generate more complex movements. For example, the hoverboard can be actuated to both turn and rotate at the same time, like a ski or a snowboard carving a turn. Thus, the examples provided above are for the purposes of illustration and are not meant to be limiting.

In another embodiment, the force directions which are output from each of the STARMs can be reversed. In this embodiment, the board can respond oppositely to the manner described above with respect to FIGS. 25A to 25E. For example, if the rider presses on fore end, the board will move in the aft direction. As another example, if the rider presses on the aft end the board will move in the forward direction. Combinations between these two examples are also possible. For example, the board can be configured to move in the port direction and the starboard direction when the board is pressed on the port side and the starboard side but move in aft direction when the board is pressed on the fore side and the fore direction when the board is pressed on the aft side.

Embodiments of the present invention further relate to computer readable media that include executable program instructions for controlling a magnetic lift system. The media and program instructions may be those specially designed and constructed for the purposes of the present invention, or any kind well known and available to those having skill in the computer software arts. When executed by a processor, these program instructions are suitable to implement any of the methods and techniques, and components thereof, described above. Examples of computer-readable media include, but are not limited to, magnetic media such as hard disks, semiconductor memory, optical media such as CD-ROM disks; magneto-optical media such as optical disks; and hardware devices that are specially configured to store program instructions, such as read-only memory devices (ROM), flash memory devices, EEPROMs, EPROMs, etc. and random access memory (RAM). Examples of program instructions include both machine code, such as produced by a compiler, and files containing higher-level code that may be executed by the computer using an interpreter.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

While the embodiments have been described in terms of several particular embodiments, there are alterations, permutations, and equivalents, which fall within the scope of these general concepts. It should also be noted that there are many alternative ways of implementing the methods and apparatuses of the present embodiments. It is therefore intended that the following appended claims be interpreted as including all such alterations, permutations, and equivalents as fall within the true spirit and scope of the described embodiments.

What is claimed is:

1. A hover engine comprising:
    an electric motor including a winding, a first set of permanent magnets and a first structure which holds the first permanent magnets wherein an electric current is applied to the winding to cause one of the winding or the first set of permanent magnets to rotate;
    an electronic speed controller which controls a rotation rate of the electric motor;
    a rotatable component, configured to receive a rotational torque from the electric motor which rotates the rotatable component, including a second set of permanent magnets and a second structure which holds the second set of permanent magnets wherein the second set of permanent magnets are rotated to induce eddy currents in a substrate such that the induced eddy currents and the second set of permanent magnets interact to generate forces which allow the hover engine to hover and translate freely in any direction above the substrate; and
    a housing enclosing the electric motor and at least a top portion of the rotatable component;
    wherein the second set of permanent magnets include a top height and a bottom height and wherein at least a portion of the winding and a portion of the first set of permanent magnets is disposed between the top height and the bottom height.

2. The hover engine of claim 1, wherein the first set of permanent magnets and the winding are disposed between the top height and the bottom height.

3. The hover engine of claim 1, wherein the second set of permanent magnets include interior sides which face a center of the rotatable component and wherein the portion of the winding and the portion of the first set of permanent magnets is disposed between the interior sides and the center of the rotatable component.

4. The hover engine of claim 1, wherein the electric motor is an axial electric motor.

5. The hover engine of claim 1, wherein the electric motor is a concentric electric motor.

6. The hover engine of claim 1, wherein each of the second set of permanent magnets includes a rectangular cross section.

7. The hover engine of claim 1, wherein a height of the second set of permanent magnets is between 0.25 inches and 3 inches.

8. The hover engines of claim 1, wherein the second set of permanent magnets are distributed around a circumference of a circle.

9. The hover engine of claim 1, wherein the second set of permanent magnets is divided into two or more groups wherein magnets in each of the two or more groups are arranged to form a rectangular array.

10. The hover engine of claim 1, wherein the second set of permanent magnets is arranged in a magnetic polarity pattern including four adjacent magnetic polarity directions including a first magnetic polarity direction pointing upwards, a second magnetic polarity direction substantially perpendicular to the first magnetic polarity direction and pointing away from the first magnetic polarity direction and pointing towards a third magnetic polarity direction, the third magnetic polarity direction substantially parallel to the first magnetic polarity direction and pointing downwards towards a bottom of the rotatable component and a fourth magnetic polarity direction substantially perpendicular to the third magnetic polarity direction and pointing towards the third magnetic polarity direction.

11. The hover engine of claim 10, wherein the magnetic polarity pattern is repeated a plurality of times among the second set of permanent magnets.

12. The hover engine of claim 1, wherein electronic speed controller is enclosed within the housing, the electronic speed controller electronically disposed between an electric power source and the electric motor.

13. The hover engine of claim 1, wherein the electronic speed controller is located outside of the housing and the housing includes apertures for receiving a wire bundle coupled to the electric motor and the electronic speed controller.

14. The hover engine of claim 1, wherein a height of the hover engine is less than three inches.

15. The hover engine of claim 1, wherein the first structure and the second structure are integrally formed.

16. The hover engine of claim 1, wherein the second structure includes a plurality of layers each layer including a plurality of apertures for receiving the second set of magnets.

17. The hover engine of claim 16, wherein a first layer is formed from a first material and a second layer formed from a second material.

18. The hover engine of claim 1 wherein the housing entirely encloses the rotatable component.

19. The hover engine of claim 1 wherein the housing encloses a portion of a bottom of the rotatable component.

20. The hover engine of claim 1 further comprising a structural member and a hinge mechanism coupled to the electric motor and the rotatable component, the structural member configured to receive a force which tilts the electric motor and the rotatable component about the hinge mechanism to change an orientation of the electric motor and the rotatable component relative to the housing.

21. The hover engine of claim 20, further comprising an actuator wherein the actuator generates the force.

22. The hover engine of claim 1, further comprising a third structure which holds the windings wherein the third structure forms a stator which is coupled to the housing.

23. The hover engine of claim 22, further comprising a structural member extending from the third structure through a center of the rotatable component wherein the structural member is coupled to the housing.

24. The hover engine of claim 1, wherein the housing is formed as two or more pieces which are fastened together.

25. The hover engine of claim 1 wherein the rotatable component includes fins configured to increase air flow around the hover engine and the housing includes apertures for directing the air flow and out of the housing.

26. The hover engine of claim 1 wherein the housing encloses the electric motor and rotatable component to allow an interior atmosphere to be maintained within the housing that is different from an exterior atmosphere outside the housing.

27. The hover engine of claim 26 wherein the interior atmosphere is maintained at a pressure which is different from the exterior atmosphere.

28. A magnetic lifting device comprising:
  one or more hover engines each hover engine including:
    an electric motor including a winding, a first set of permanent magnets and a first structure which holds the first permanent magnets wherein an electric current is applied to the winding to cause one of the winding or the first set of permanent magnets to rotate;
    an electronic speed controller which controls a rotation rate of the electric motor;
    a rotatable component, configured to receive a rotational torque from the electric motor which rotates the rotatable component, including a second set of permanent magnets and a second structure which holds the second set of permanent magnets wherein the second set of permanent magnets are rotated to induce eddy currents in a substrate such that the induced eddy currents and the second set of permanent magnets interact to generate forces which allow the magnetic lifting device to hover and translate freely in any direction above the substrate; and
    a housing enclosing the electric motor and at least a top portion of the rotatable component; wherein the second set of permanent magnets include a top height and a bottom height and wherein at least a portion of the winding and a portion of the first set of permanent magnets is disposed between the top height and the bottom height;
  an electric power source which generates the electric current; and
  a support structure holding the one or more hover engines and the electric power source.

* * * * *